(12) United States Patent
Farkas et al.

(10) Patent No.: US 9,362,764 B2
(45) Date of Patent: Jun. 7, 2016

(54) PORTABLE RECHARGEABLE POWER SUPPLY

(71) Applicant: Tsuga Engineering LLC, Bellingham, WA (US)

(72) Inventors: George Farkas, Bellingham, WA (US); Daniel Krones, Mission Viejo, CA (US); Wesley Ellis, Bellingham, WA (US)

(73) Assignee: Tsuga Engineering LLC, Bellingham, WA (US)

( * ) Notice: Subject to any disclaimer, the term of this patent is extended or adjusted under 35 U.S.C. 154(b) by 541 days.

(21) Appl. No.: 13/748,385

(22) Filed: Jan. 23, 2013

(65) Prior Publication Data

US 2013/0200841 A1 Aug. 8, 2013

Related U.S. Application Data

(60) Provisional application No. 61/632,301, filed on Jan. 23, 2012.

(51) Int. Cl.
*H02J 7/00* (2006.01)

(52) U.S. Cl.
CPC ............. *H02J 7/0042* (2013.01); *H02J 7/0011* (2013.01); *H02J 7/0027* (2013.01)

(58) Field of Classification Search
USPC .......... 320/103, 104, 107, 108, 111, 113, 114
See application file for complete search history.

(56) References Cited

U.S. PATENT DOCUMENTS

| 5,929,597 | A | 7/1999 | Pfeifer et al. | |
|---|---|---|---|---|
| 6,504,343 | B1 * | 1/2003 | Chang | 320/124 |
| 8,629,651 | B2 * | 1/2014 | Guccione et al. | 320/108 |
| 2004/0155631 | A1 * | 8/2004 | Ishizu | 320/166 |
| 2006/0139011 | A1 * | 6/2006 | Yang | 320/141 |
| 2006/0267547 | A1 * | 11/2006 | Godovich | 320/107 |
| 2007/0210750 | A1 * | 9/2007 | Cha | 320/114 |
| 2008/0053716 | A1 * | 3/2008 | Scheucher | 180/2.1 |
| 2008/0054842 | A1 | 3/2008 | Kim et al. | |
| 2009/0267562 | A1 * | 10/2009 | Guccione et al. | 320/114 |
| 2011/0068741 | A1 | 3/2011 | Liu | |
| 2011/0316472 | A1 * | 12/2011 | Han et al. | 320/103 |

FOREIGN PATENT DOCUMENTS

WO 2009132193 10/2009

OTHER PUBLICATIONS

PCT International Searching Authority, International Search Report, PCTUS2013022779, Apr. 18, 2013, 7 pages.

* cited by examiner

*Primary Examiner* — Brian Ngo
(74) *Attorney, Agent, or Firm* — Michael R. Schacht; Schacht Law Office, Inc.

(57) ABSTRACT

A portable power supply adapted to be connected to an external power source and to an electronic device comprises a main module comprising a battery, a satellite module comprising an input port, and output port, and an interface panel, and a tether cable, and a controller. The controller a first mode to allow the battery to be charged when the external power supply is connected to the input port, a second mode to allow power to be supplied to the electronic device from the battery when the electronic device is connected to the output port, and a third mode to allow the battery to be charged and power to be supplied to the electronic device when the external power supply is connected to the input port and the electronic device is connected to the output port.

18 Claims, 16 Drawing Sheets

FIG. 1
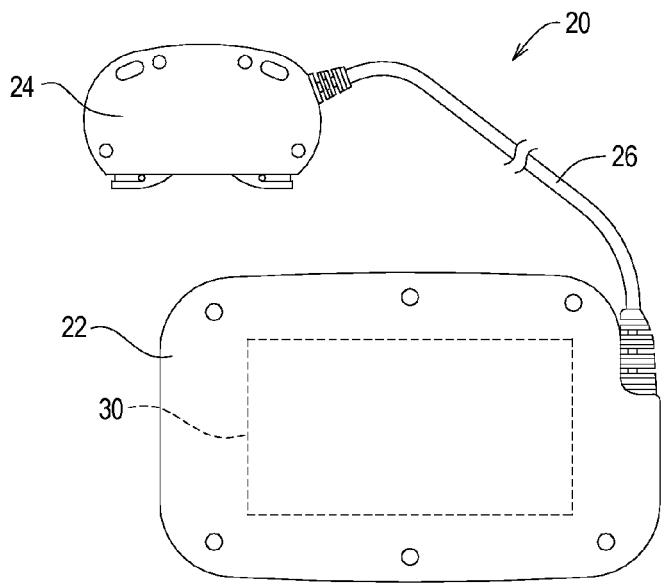
FIG. 1A
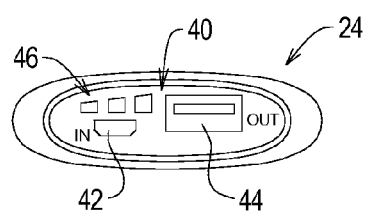
FIG. 2
FIG. 3
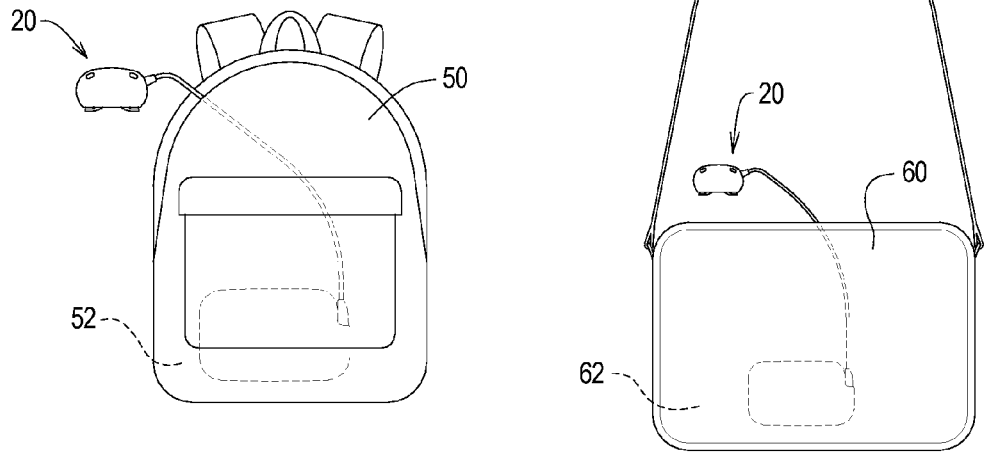

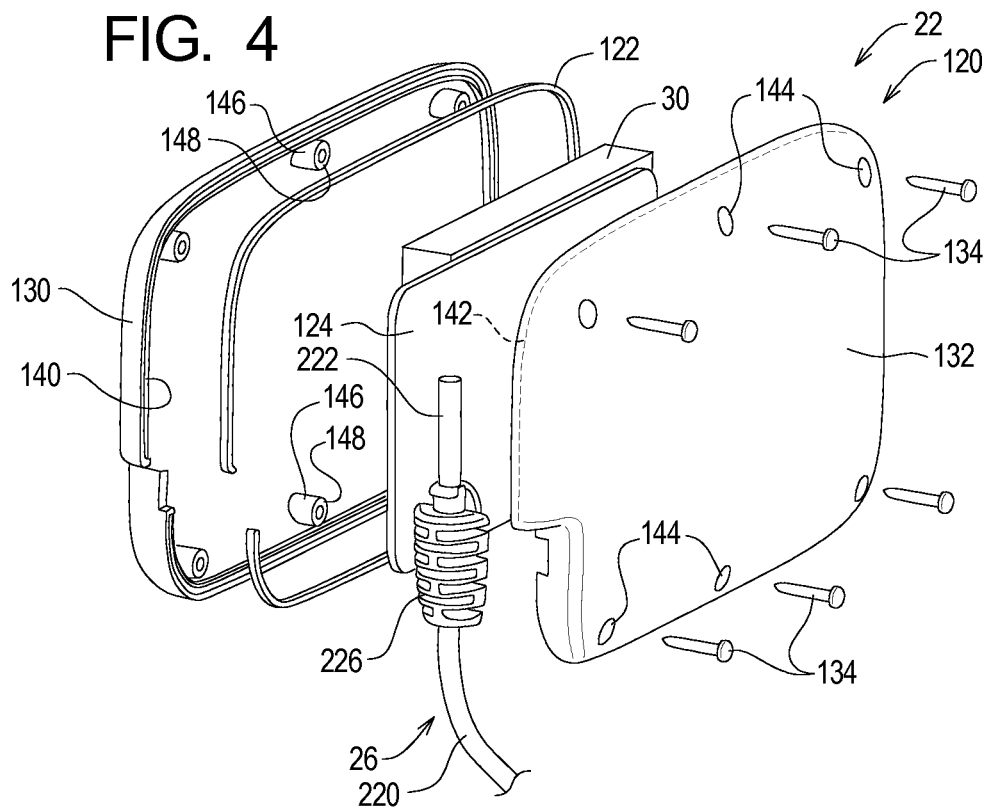

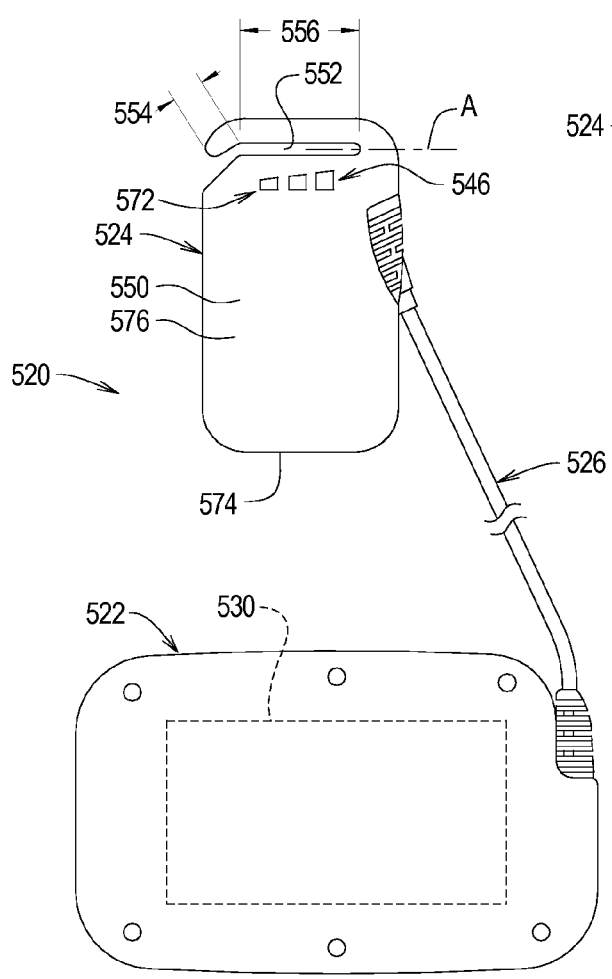
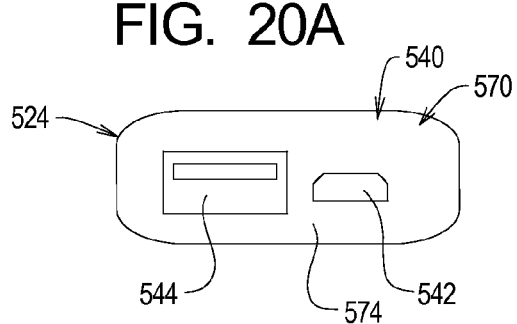
FIG. 20
FIG. 20A

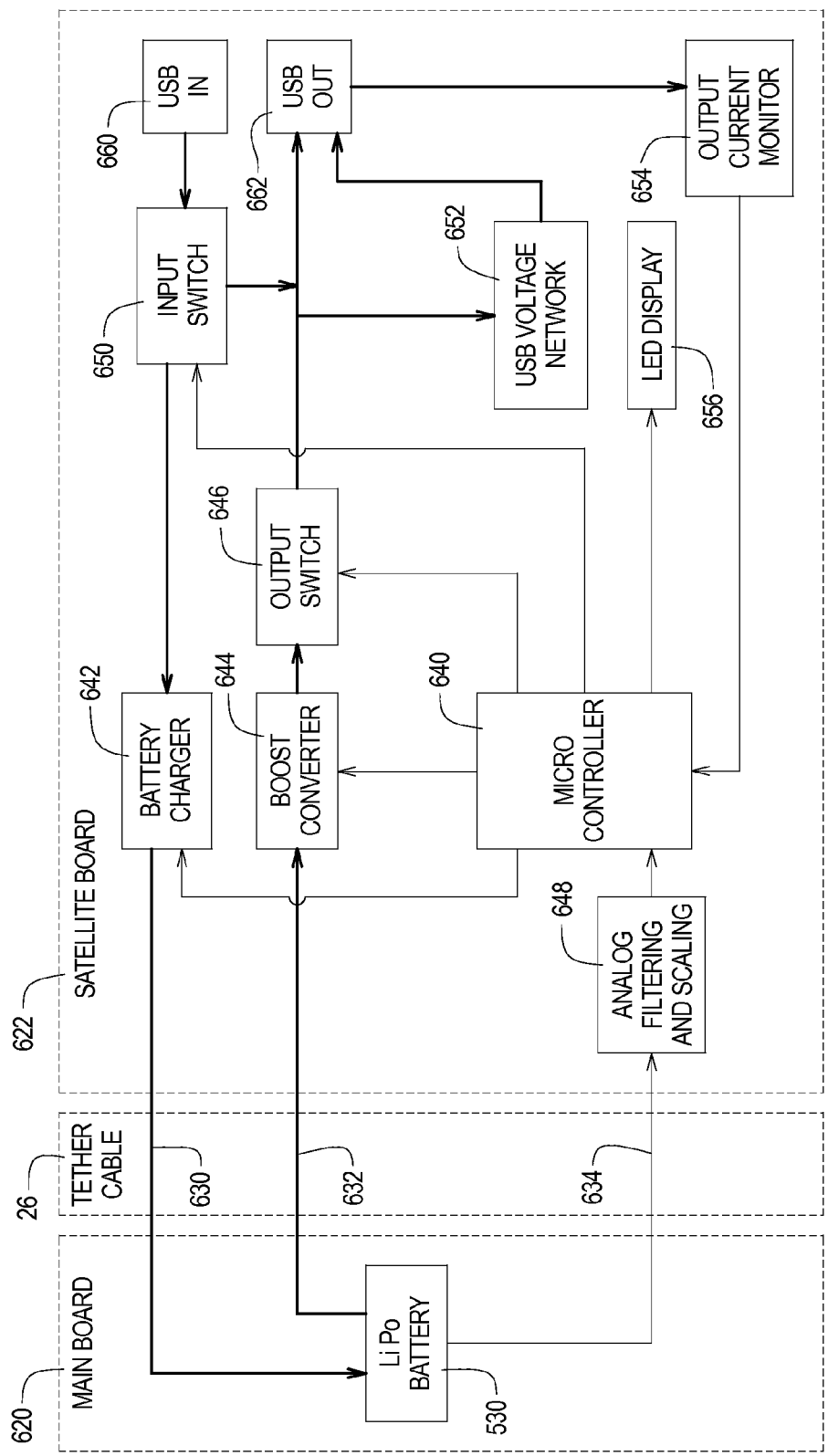

PORTABLE RECHARGEABLE POWER SUPPLY

RELATED APPLICATIONS

This application, U.S. patent application Ser. No. 13/748,385 filed on Jan. 23, 2013, claims benefit of U.S. Provisional Application Ser. No. 61/632,301 filed Jan. 23, 2012, the contents of which are incorporated herein by reference.

TECHNICAL FIELD

The present invention relates to rechargeable power supplies and, in particular, to portable rechargeable power supplies configured for use in a portable container such as a backpack, briefcase, purse, or the like.

BACKGROUND

Portable electronic devices such as computers, cell phones, music players, video games, and the like have limited battery life. In some situations, utility power for recharging the internal batteries of portable electronic devices is unavailable or inconvenient. Accordingly, rechargeable power supplies have been developed to allow portable electronics to be operated and/or recharged when the battery internal to the portable electronic device has or may become discharged and utility power is not available. Rechargeable power supplies typically comprise a battery, electronics for charging and discharging the battery, and appropriate ports and cables for attaching to portable electronic devices.

Rechargeable power supplies are typically small enough to be carried in a portable container, in some situations the same portable carrier used to carry the user's portable electronic device(s). A user will commonly store the rechargeable power supply and any associated cables within a compartment of the portable container. Prior to use, the user will remove the rechargeable power supply and any required cables. To supply power to a portable electronic device, the user connects the required cables between the rechargeable power supply and the portable electronic device. If the cable lengths are sufficient, the user may place the rechargeable power supply back into the portable container while the rechargeable power supply is delivering power to the portable electronic device. The rechargeable power supply is similarly removed from the portable container prior to charging, and the appropriate cable is connected between the rechargeable power supply and the utility power outlet.

Conventional rechargeable power supplies are typically engineered without regard to the environment in which they will be used. Accordingly, the storage and use of a conventional rechargeable power supply when used in conjunction with a typical portable container typically is relatively inefficient. An object of the present invention is to provide power to portable electronic devices that are optimized for use in conventional portable containers.

SUMMARY

The present invention may be embodied as a portable power supply adapted to be connected to an external power source and to an electronic device. A portable power supply of the present invention may comprise a main module comprising a main board, a satellite module comprising a satellite board and defining an interface system, a tether cable comprising a plurality of cable conductors operatively connected between the main board and the satellite board, and an electrical circuit having a first portion mounted on the main board and a second portion mounted on the satellite board, where the first portion comprises a rechargeable energy storage device. The electrical circuit and the plurality of cable conductors allow the rechargeable energy storage device to be charged by connecting the external power supply to the interface system. The electrical circuit and the plurality of cable connectors allow power to be supplied to the portable electronic device by connecting the external power supply to the interface system.

A portable power supply adapted to be connected to an external power source and to an electronic device comprises a main module comprising a battery, a satellite module comprising an input port, and output port, and an interface panel, and a tether cable, and a controller. The controller a first mode to allow the battery to be charged when the external power supply is connected to the input port, a second mode to allow power to be supplied to the electronic device from the battery when the electronic device is connected to the output port, and a third mode to allow the battery to be charged and power to be supplied to the electronic device when the external power supply is connected to the input port and the electronic device is connected to the output port.

The present invention may also be embodied as a method of providing power from an external power source to an electronic device comprising the following steps. A main module comprising a battery is provided. A satellite module comprising an input port, an output port, and an interface panel is provided. A tether cable is connected between the main module and the satellite module. When the external power supply is connected to the input port and the electronic device is connected to the output port, power is supplied to at least one of the electronic device and the battery. The interface panel is operated to indicate at least a status of the battery.

BRIEF DESCRIPTION OF THE DRAWINGS

FIG. 1 is a top elevation view of a first example first example rechargeable power supply system of the present invention;

FIG. 1A is a front elevation view of a satellite module of the first example rechargeable power supply;

FIG. 2 is a partial schematic view of the first example rechargeable power supply being used with portable container such as a backpack;

FIG. 3 is a somewhat schematic view of the first example rechargeable power supply being used with a portable container such as a bag, purse, or briefcase;

FIG. 4 is a partial simplified exploded view of a main module of the first example first example rechargeable power supply system;

FIG. 5 is a partial simplified exploded view of the satellite module of the first example first example rechargeable power supply system;

FIG. 20 is a top elevation view of a second example rechargeable power supply system of the present invention;

FIG. 20A is a front elevation view of a satellite module of the second example rechargeable power supply;

FIG. 22 is an electrical block diagram representing the operation of the electronics for the main board, satellite board, and the tether cable assembly connecting the main board and the satellite board of the second example rechargeable power supply.

DETAILED DESCRIPTION

Figure 6:
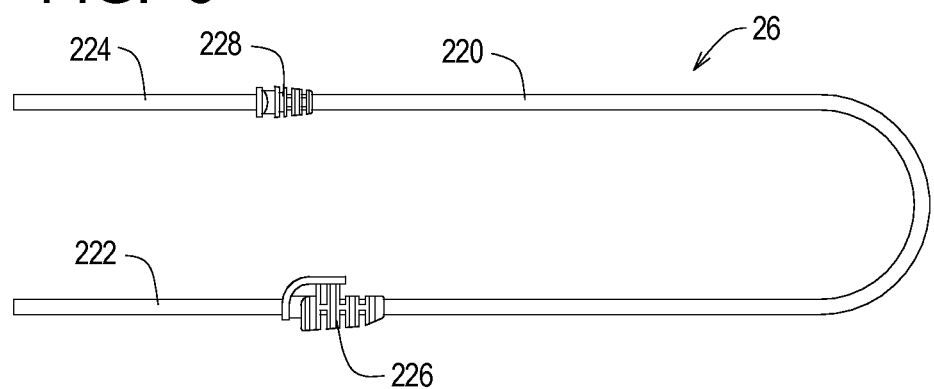
FIG. 6 is a side elevation view of the tether cable assembly of the first example first example rechargeable power supply system.

Referring initially to FIGS. 1 and 1A of the drawing, depicted therein is a first example rechargeable power supply system 20 constructed in accordance with, and embodying, the principles of the present invention. The first example rechargeable power supply system 20 comprises a main module 22, a satellite module 24, and a tether cable assembly 26. Power is stored in the main module 22 and accessed through the satellite module 24, and the tether cable assembly 26 extends between and electrically connects the main module 22 and the satellite module 24.

In particular, shown in broken lines in FIG. 1 is a rechargeable energy storage device 30 such as a battery or battery pack capable of storing and supplying electrical power. Batteries are currently the most readily available and cost effective way to form the energy storage/conversion device 30, the term "battery" will be used herein to refer to the energy storage device 30, but any suitable device, such as a capacitive energy storage system, fuel cell system, or the like, may be used as the energy storage device 30 with suitable modifications to the monitoring and control circuitry described below.

FIG. 1A shows that the example satellite module 24 has an interface system 40 comprising an input port 42, an output port 44, and an indicator panel 46. The tether cable assembly 26 connects the input port 42 to the battery 30 such that an appropriate charge signal applied to the input port 42 charges the battery 30 in a charge mode. The tether cable assembly 26 similarly connects the output port 44 to the battery 30 such that a power signal appropriate for applying power to an electronic device is available at the output port 44 in a power mode. With access of the satellite module 24, but without touching or even seeing the main module 22, the user of the example rechargeable power system 20 thus may charge and/or obtain power from the battery 30.

Further, the indicator panel 46 is also operatively connected to the battery 30 through the tether cable assembly 26. The indicator panel 46 communicates information about the status of the battery 30 to user who has access to the satellite module 24 but not the main module 22.

Conventionally, the battery 30 is by far the heaviest component of the example first example rechargeable power supply system 20, so the example satellite module 24 is significantly lighter and easier to manipulate than the example main module 22. This configuration of the main module 22 connected to the satellite module 24 by the tether cable assembly 26 allows the relatively heavy main module 22 containing the battery 30 to be physically separated from the relatively light satellite module 24, which may be useful in many operating environments.

FIGS. 2 and 3 of the drawing depict several possible operating environments in which the example first example rechargeable power supply system 20 may be used. In FIG. 2, the example first example rechargeable power supply system 20 is depicted in combination with a first example portable container 50 taking the form of a backpack defining a first container compartment 52. In FIG. 3, the example first example rechargeable power supply system 20 is depicted in combination with a second example portable container 60 taking the form of a purse, bag, or briefcase defining a second container compartment 62.

With either the first portable container 50 or the second example portable container 60, the main module 22 is stored within the container compartment 52 or 62, respectively, and the tether cable assembly 26 allows the satellite module 24 to be arranged within, but easily accessible from outside of, the container compartment 52 or 62 as shown in FIGS. 2 and 3. Alternatively, the satellite module 24 may simply be arranged outside of the of the container compartment 52 or 62 while the main module 22 is stored within the container compartment 52 or 62. In either case, the user need not remove or even touch the relatively heavy main module 22 when using the example first example rechargeable power supply system 20 in the charge mode or the power mode or to determine the status of the battery 30. Further, the relatively heavy main module 22 may be arranged at the bottom of the container compartment 52 or 62 to render the container 50 or 60 more stable when placed on a support surface.

With the foregoing general understanding of the present invention in mind, the details of construction and operation of the example first example rechargeable power supply system 20 will now be described in further detail.

FIG. 4 depicts an exploded view of the example main module 22. As shown in FIG. 4, the example main module 22 comprises, in addition to the battery 30, a main housing assembly 120, a main gasket 122, and a main circuit board 124.

The example main housing assembly 120 comprises a first main housing member 130, a second main housing member 132, and a plurality of screws 134. The first and second main housing members 130 and 132 each define a perimeter groove 140 and 142. The screws 134 extend through holes 144 formed in the second housing member 132 and are received by threaded bosses 146 formed on the first housing member 130. When the housing members 130 and 132 are secured together using the screws 134, the perimeter grooves 140 and 142 are sized and dimensioned to receive the main housing gasket 122 such that fluid flow between the first and second housing members 130 and 132 is inhibited along at least a portion of the perimeter of the housing assembly 120. In addition, screw gaskets 148 may be arranged on each of the bosses 146 and/or around each of the screws 134 substantially to inhibit fluid flow through the holes 144 in the second housing member 132.

FIG. 5 is an exploded view of the example satellite module 24. As shown in FIG. 4, the example satellite module 24 comprises a satellite housing assembly 150, first and second housing satellite gaskets 152 and 154, a satellite circuit board 156, and a satellite cover 158.

The example satellite housing assembly 120 comprises a first satellite housing member 160, a second satellite housing member 162, a faceplate member 164, a light pipe member 166, and a plurality of screws 168. The first and second satellite housing members 160 and 162 each define a perimeter groove 170 and 172. The screws 168 extend through holes 174 formed in the first housing member 160 and are received by threaded bosses 176 formed on the second housing member 162. When the housing members 160 and 162 are secured together using the screws 168, the perimeter grooves 170 and 172 are sized and dimensioned to receive the satellite housing gaskets 152 and 154 such that fluid flow between the first and second housing members 160 and 162 is inhibited along at least a portion of the perimeter of the housing assembly 150. In addition, screw gaskets 178 may be arranged on each of the bosses 176 and/or around each of the screws 168 substantially to inhibit fluid flow through the holes 174 in the second housing member 162.

The faceplate member 164 defines a first connector opening 180, a second connector opening 182, and first, second, and third light openings 184, 186, and 188. The faceplate member 164 is held between the first and second housing members 160 and 162 to define an indicator portion of the perimeter of the housing assembly 150.

Supported on the satellite circuit board 154 are first and second satellite connectors 190 and 192. The lens member 166 defines first, second, and third lens portions 194, 196, and 198. The example first satellite connector 190 may be any electrical connector capable of supplying a charge signal of appropriate voltage and current to charge the battery 30 as will be described in further detail below. The example first satellite connector 190 is a micro Universal Serial Bus (USB) type B socket. The example second satellite connector 192 may be any electrical connector capable of supplying a power signal of appropriate voltage and current to supply power to a portable electronic device as will be described in further detail below. The example second satellite connector 192 is a standard USB type A socket.

The faceplate member 164 is supported by the housing assembly 150 relative to the satellite circuit board 156 such that the first and second satellite connectors 190 and 192 are aligned with the first and second connector openings 180 and 182, respectively. The lens member 166 is supported by the housing assembly 150 and/or the satellite circuit board 156 such that first, second, and third lens portions 194, 196, and 198 are aligned with the first, second, and third lens openings 184, 186, and 188, respectively.

The satellite cover 158 engages the satellite cover assembly 150 at the indicator portion of the perimeter of the cover assembly 150 to inhibit fluid flow between the faceplate member 164 and the cover assembly 150 and/or through the openings 180-188 formed in the faceplate member 164.

Figure 7:
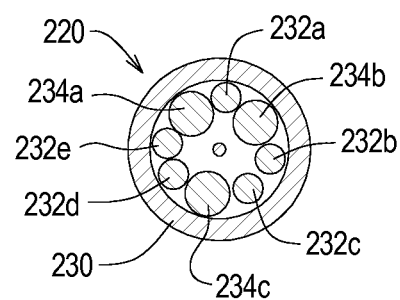
FIG. 7 is a section view showing the conductors within the tether cable assembly.

FIG. 6 is an illustration of a tether cable assembly 26 comprising a tether cable 220 having a first end portion 222 and a second end portion 224, a first strain relief member 226, and a second strain relief member 228. The first strain relief member 226 is arranged adjacent to the first end portion 222, and the second strain relief member 228 is arranged adjacent to the second end portion 224. FIG. 7 illustrates that the example tether cable 220 comprises a jacket 230, first, second, third, fourth, and fifth data conductors 232a, 232b, 232c, 232d, and 232e and first, second, and third power conductors 234a, 234b, and 234c.

FIG. 4 indicates that, in the example first example rechargeable power supply system 20, the tether cable assembly 26 is arranged such that the first end portion 222 of the tether cable 220 is arranged within the main housing 22 to allow the data conductors 232a-e and power conductors 234a-c to be connected to the main circuit board 124. Similarly, the second end 224 of the tether cable 220 is arranged within the satellite housing 24 to allow the data conductors 232a-e and power conductors 234a-c to be connected to the satellite circuit board 156. Additionally, the example power conductors 234 are insulated with "FEP" (Teflon) insulation. FEP insulation is a high temperature insulation material with a much higher melting temperature than more traditionally used PVC (polyvinylchloride) insulation.

The first strain relief member 226 is arranged on the tether cable 220 to inhibit damage to the conductors 232a-e and 234a-c and to inhibit intrusion of fluids into the main housing assembly 120 between the first and second main housing members 130 and 132 and the tether cable 220. The second strain relief member 228 is also arranged on the tether cable 220 to inhibit damage to the conductors 232a-e and 234a-c and to inhibit intrusion of fluids into the satellite housing assembly 150 between the first and second satellite housing members 160 and 162 and the tether cable 220.

Referring now to FIGS. 8-11, several examples of use of the example first example rechargeable power supply system 20 will now be described. It should be noted that, in each of the scenarios depicted in FIGS. 8, 9, 10, and 11, only the satellite module 24 is illustrated. This depiction of the use of the example first example rechargeable power supply system 20 of the present invention thus emphasizes that all of the functions of the first example rechargeable power supply system 20 may be accessed through the satellite module 24 and access to the main module 22 is not required for use of the power supply system 20.

Figure 8:
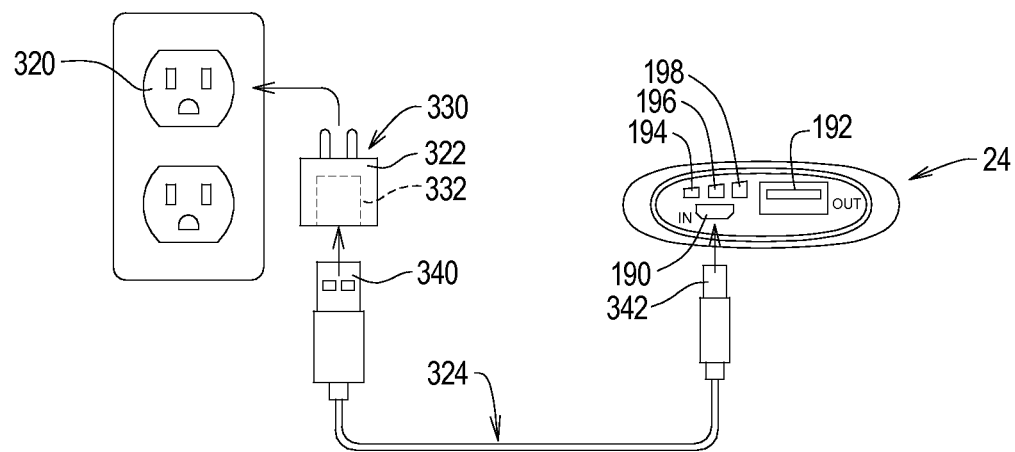
FIG. 8 is a partial schematic view depicting a use of the first example first example rechargeable power supply system in a charge mode with an outlet.

FIG. 8 depicts a scenario in which the example first example rechargeable power supply system 20 is being charged using utility power available at an outlet 320. In the example charging scenario depicted in FIG. 8, a power adapter 322 and charge cable 324 are used.

The example power adapter 322 defines a plug portion 330 and an adapter connector 332. The plug portion 330 is adapted to engage the outlet 320 in a conventional manner. The adapter connector 332 is any connector capable of supplying a power signal at a voltage and current suitable for charging the battery 30 as will be described in further detail below. The example adapter connector 332 is a standard USB type A socket connector. The power adapter 322 further contains circuitry (not shown) capable of generating the suitable power signal at the adapter connector 332 based on utility power available at the outlet 320. As one example, Apple Inc. sells a power adapter with many of its portable electronic products suitable for use as the example power adapter 322.

The example charge cable 324 comprises a first charge connector 340 and a second charge connector 342. For the example power adapter 322, the first charge connector 340 is a standard USB type A plug connector capable of forming an electrical connection with a standard type A USB socket such as the connector forming the example adapter connector 332. The second charge connector 342 may be formed by any connector capable of supplying the power signal suitable for supplying power to the battery 30. The example second charge connector 342 is a micro USB type B plug connector capable of forming an electrical connection with the example first satellite connector 190. The example charge cable 324 is typically sold with the example rechargeable power supply 20. The design of the example charge cable 324 is generally conventional, but the example charge cable 324 is manufactured using #22 awg or #24 awg wires or larger.

With the power adapter 322 plugged into the outlet 320 and the charge cable 324 connected between the power adapter 322 and the satellite module 24, the battery 30 will be charged. The status of the battery charge may be determined by the illumination configuration transmitted through the lens member 166. In particular, a low level charge is indicated when the first lens portion 194 is illuminated, a medium level charge is indicated when the first and second lens portions 194 and 196 are illuminated, and a high charge level is indicated when the first, second, and third lens portions 194, 196, and 198 are illuminated. In the example first example rechargeable power supply system 20, the third lens portion 198 is larger in visible cross-section than the second lens portion 196, and the second lens portion 196 is larger in visible cross-section than the first lens portion 194. These varying sizes may communicate additional information to the user.

In addition to binary (ON/OFF) illumination and different visible cross-sectional areas of the lens portions 194, 196, and/or 198, colors of light or lens may be used in addition or instead to communicate information to the user.

Figure 9:
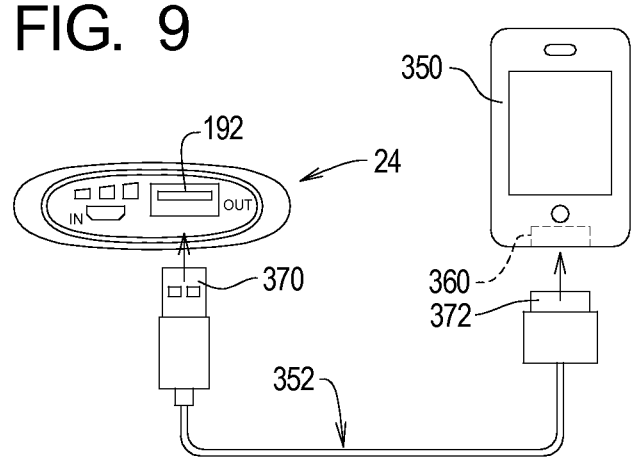
FIG. 9 is a partial schematic view depicting a use of the first example first example rechargeable power supply system in a power mode.

FIG. 9 depicts a scenario in which the example first example rechargeable power supply system 20 is being used to supply power to a portable electronic device 350. In the example powering scenario depicted in FIG. 9, a power cable 352 is used.

The example portable electronic device 350 is a cellular telephone defining a device connector 360. The device connector 360 is any connector capable of accepting a power signal at a voltage and current suitable for operating the portable electronic device 220 in a conventional manner. The example portable electronic device 350 is a cellular telephone, and the example device connector 360 is or may be any device that is USB compliant. Other portable electronic devices and connectors may be used as required by the user.

The example power cable 352 comprises a first power connector 370 and a second power connector 372. The example first power connector 370 is a standard USB type A plug connector capable of forming an electrical connection with the standard USB type A socket forming the second satellite connector 192. The second power connector 372 may be formed by any connector capable of supplying the power signal suitable for operating the portable electronic device 350. In a case where the portable electronic device 350 is an Apple iPhone, the example second power connector will be an Apple plug connector capable of forming an electrical connection with the example device connector 360. Typically, the power cable 352 will be supplied with the portable electronic device 350 and is provided by the user.

With the power cable 352 connected between the satellite module 24 and the portable electronic device 350, the battery 30 will supply power to the portable electronic device 350. The status of the remaining battery charge may be determined by the illumination configuration transmitted through the lens member 166 as generally discussed above.

Figure 10:
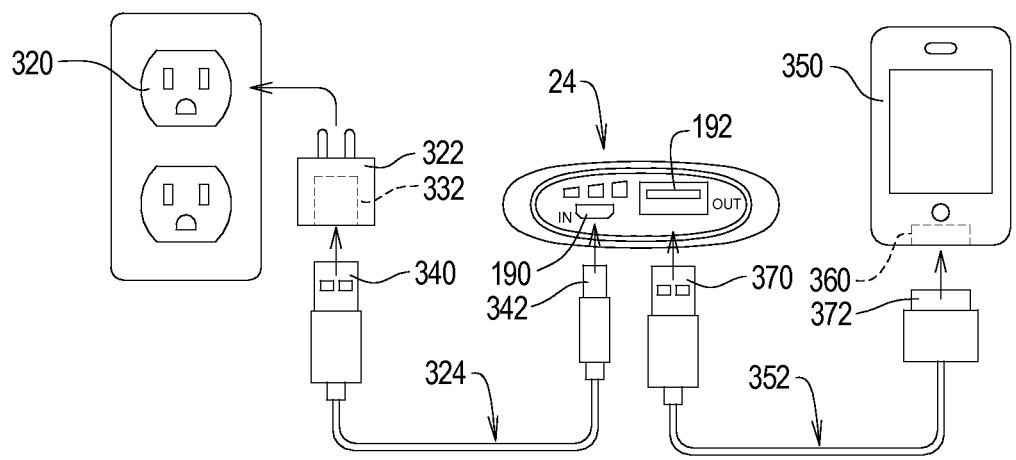
FIG. 10 is a partial schematic view depicting a use of the first example first example rechargeable power supply system in a charge/power mode with an outlet.

FIG. 10 depicts a scenario in which the example first example rechargeable power supply system 20 is being charged and, at the same time, being used to supply power to a portable electronic device 350. In the first example bimodal scenario depicted in FIG. 10, the outlet 320, power block 322, charge cable 324, portable electronic device 350, and power cable 352 are used simultaneously as generally described above.

Figure 11:
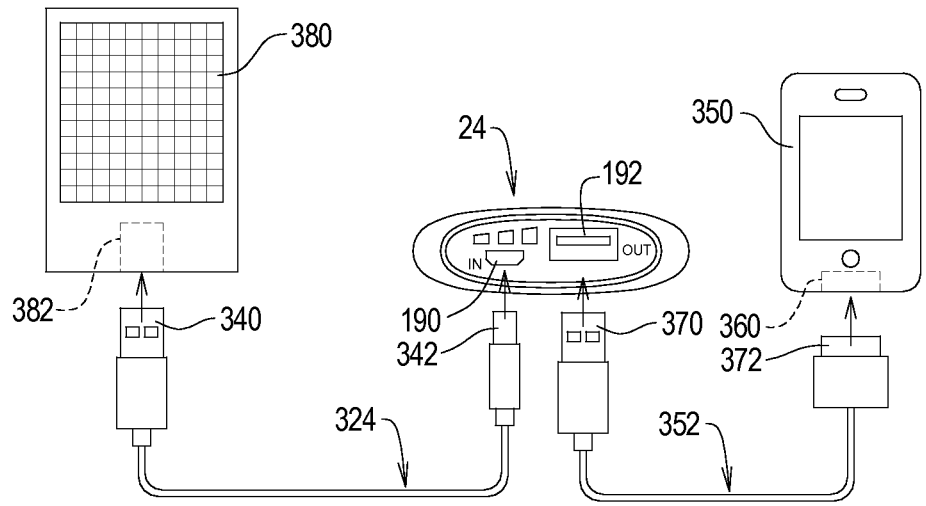
FIG. 11 is a partial schematic view depicting a use of the first example first example rechargeable power supply system in a charge/power mode with a solar panel.

FIG. 11 depicts a scenario, similar to that depicted in FIG. 10, in which the example first example rechargeable power supply system 20 is being charged and, at the same time, being used to supply power to a portable electronic device 350. In the second example bimodal scenario depicted in FIG. 11, a solar panel 380 is provided in place of the outlet 320.

The example solar panel 380 is provided with a panel connector 382 capable of generating, based on solar energy, a charge signal suitable for powering the portable electronic device 350. The panel connector 382 is any connector capable of transmitting the appropriate charge signal to the power cable 324. In the example depicted in FIG. 11, the panel example connector 382 is standard USB type A socket connector capable of interfacing with the first power connector 340 of the power cable 324. Alternatively, the power cable 324 may be hardwired to the solar panel 380, eliminating the need for the panel connector 382 and a separate power cable having a first connector such as the example first connector 340 described above.

Figure 12:
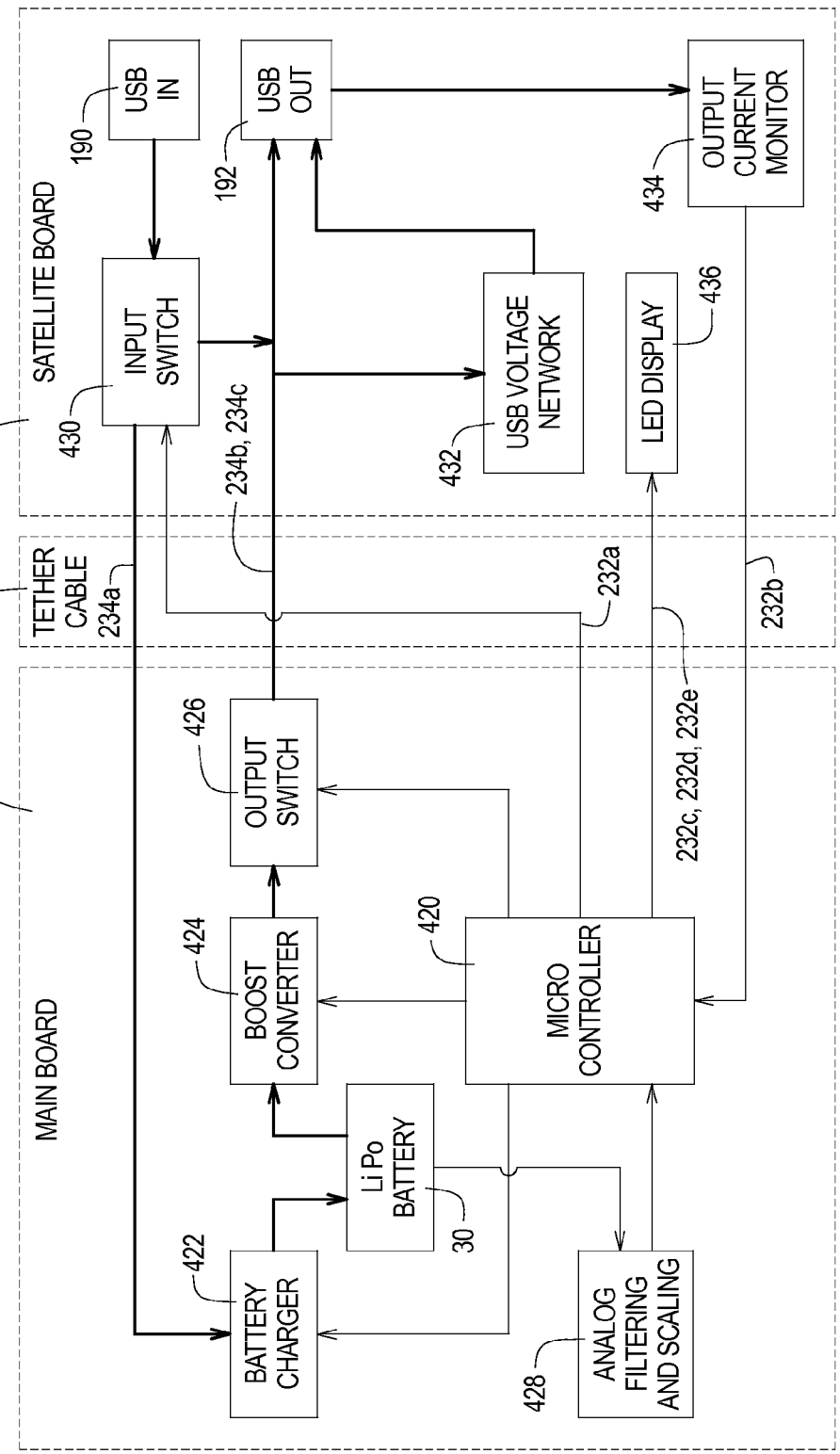
FIG. 12 is an electrical block diagram representing the operation of the electronics for the main board, satellite board, and the tether cable assembly connecting the main board and the satellite board of the first example rechargeable power supply.

Turning now to FIG. 12, depicted therein is an electrical block diagram representing the operation of the electronics contained on the main board 124 and satellite board 156. FIG. 12 also represents the tether cable assembly 26 and, in particular, the data conductors 232a-e and power conductors 234a-c of the tether cable assembly 26.

The example main board 124 comprises a microcontroller 420, a battery charger 422, a power converter 424, an output switch 426, and an analog input scaling and filtering circuit 428.

The example satellite board 156 comprises an input switch 430, a device voltage network 432, a current monitor circuit 434, and a display circuit 436. The example display circuit 436 comprises a first LED 440, a second LED 442, and a third LED 444. FIG. 12 also shows that the example first and second satellite connectors 190 and 192 are also mounted on the example satellite board 156. The first, second, and third LED's 440, 442, and 444 are also depicted in FIG. 5 of the drawing as one example of how they may be mounted on the example satellite board 156.

Referring now to FIGS. 13-19 of the drawing, depicted therein are schematic diagrams depicting circuits that may be used to implement the functionality of the electronics of the example first example rechargeable power supply system 20. The operation of the circuits described in FIGS. 13-19 will be described below. Exhibit A attached to and forming a part of this specification contains the text of U.S. Provisional Ser. No. 61/632,301 of which this application claims benefit. Exhibit A contains an event more detailed discussion of the circuits depicted in FIGS. 13-19.

Figure 13:
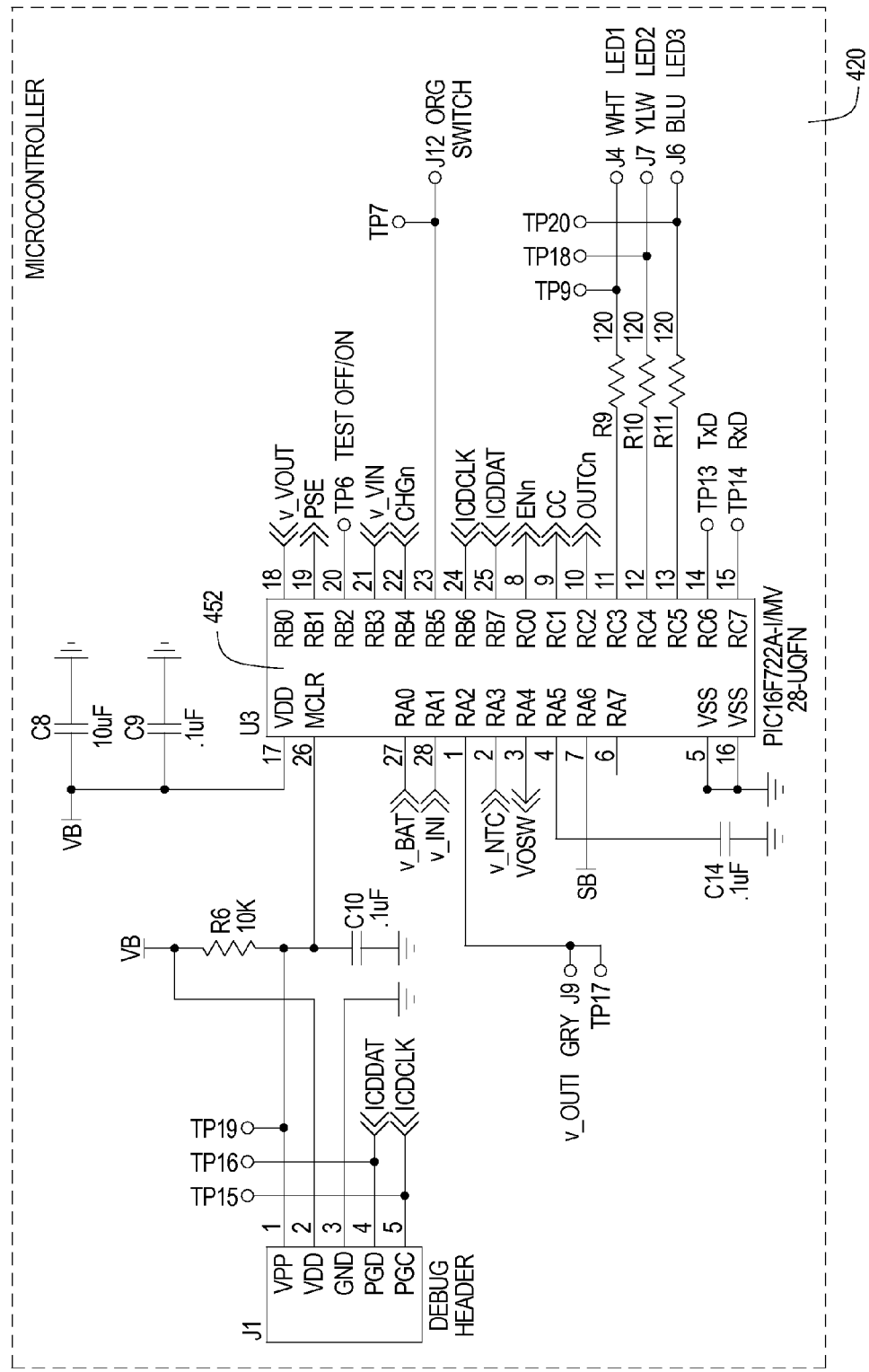
FIG. 13 is a partial schematic illustrating details of a circuit that may be used to embody an example microcontroller of the main board.

FIG. 13 illustrates details of an example circuit that may be used to embody the example microcontroller 420. The example microcontroller 420 comprises a central processing unit (CPU) 452 capable of storing and running software and/or firmware as will be described in further detail below. The purpose of the microcontroller is to receive information from the other parts of the system, including elapsed time, process the information in a manner suitable for portable battery operated power supply use, and generate control signals based on these factors that operates the power supply system 420 given a blend of available resources and to yield a desired user experience.

Figure 14:
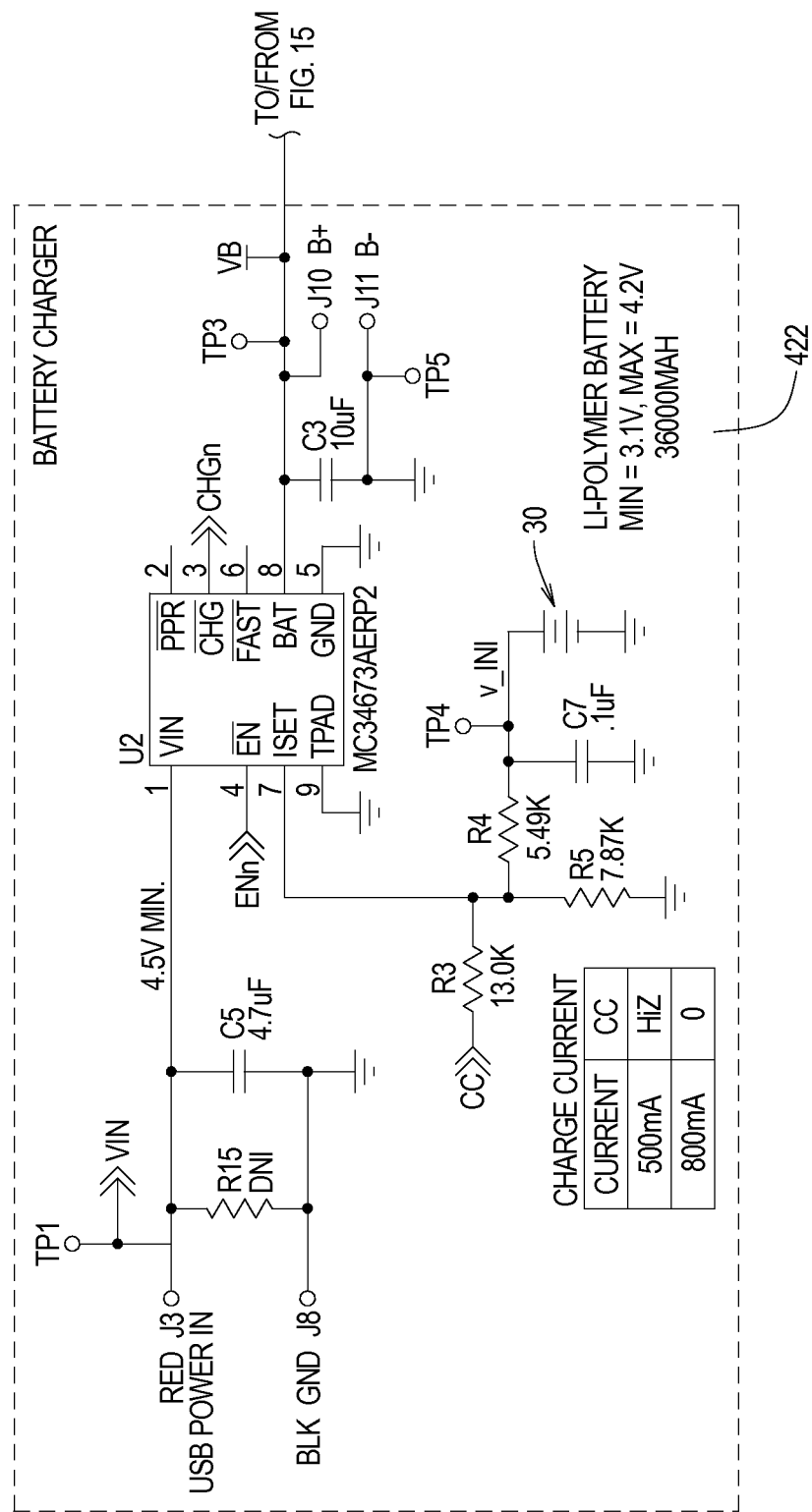
FIG. 14 is a partial schematic illustrating details of a circuit that may be used to embody an example battery charger of the main board.

FIG. 14 illustrates details of an example circuit that may be used to embody the example battery charger 422 and illustrates how this circuit is connected to the battery 30. The purpose of the battery charger circuit is to convert the incoming power (typically 5V) into a voltage and current suitable to charge the re-chargeable battery. This example is using a single cell lithium-polymer battery with an operating voltage range from 3.0V to 4.2V (3.7V nominal). This example is a 1 C cell and must be charged within these parameters. The battery charger circuit converts the incoming 5V power to an appropriate voltage to maintain a 1 C charge current when the cell is between 3.0-4.2 volts. When the cell is below 3.0V the charge controller charges at a rate closer to 0.2 C. Also, when the battery reaches near full charge between 4.15 and 4.20 volts the charge controller switches into a "voltage mode", once again reducing the charge current closer to 0.2 C. The example charge controller is a "linear mode" device and as such dissipates charge power differences between incoming and battery level as heat. A "switch-mode" charge controller may be used in place of the example "linear mode" charge control device to reduce IR losses.

Figure 15:
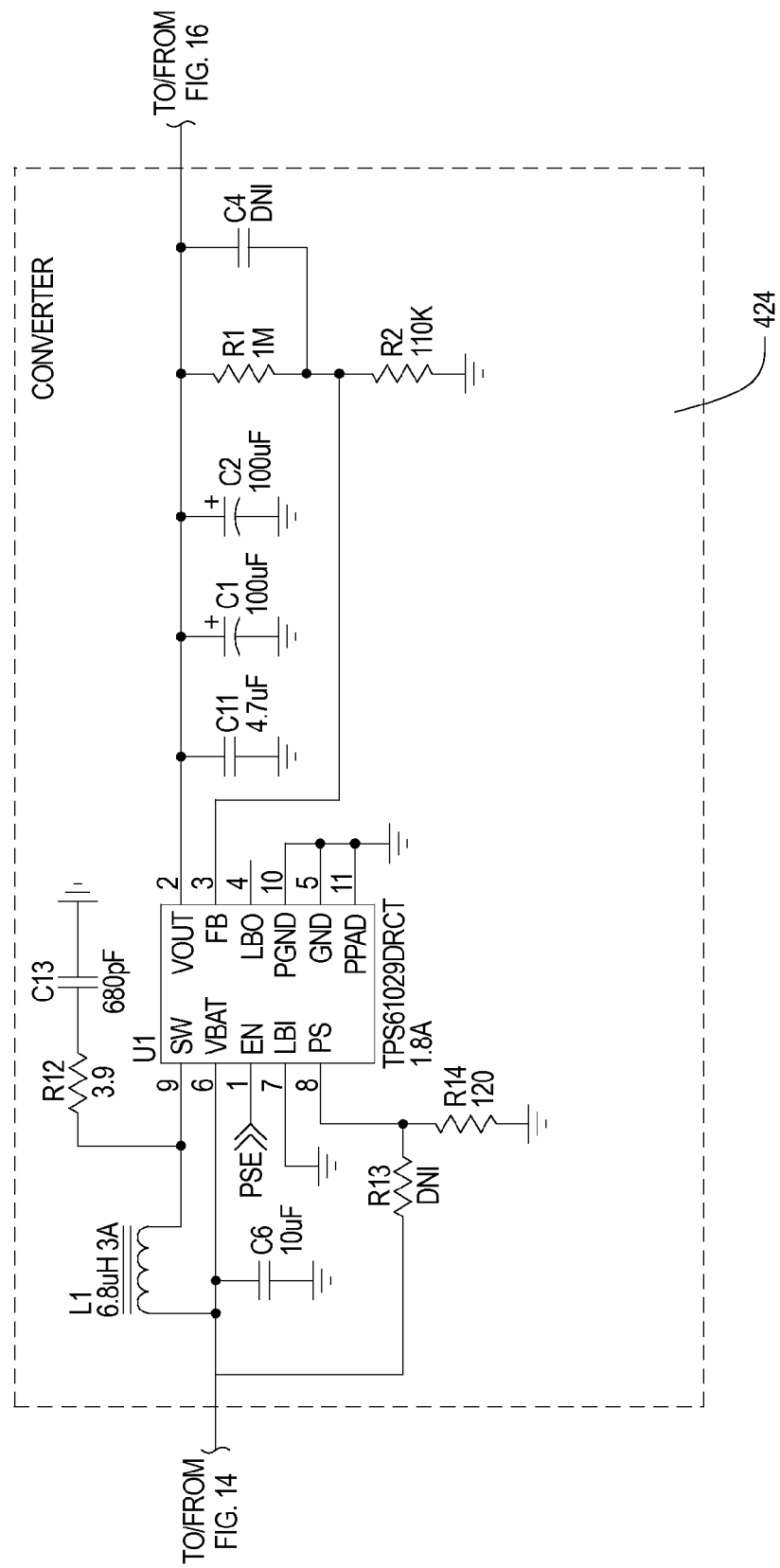
FIG. 15 is a partial schematic illustrating details of a circuit that may be used to embody an example power converter of the main board.

FIG. 15 illustrates details of an example circuit that may be used to embody the example power converter 424. The purpose of the power converter is to convert the stored battery power into a stable, regulated, USB compatible 5 volts. In the example circuit this is accomplished using a synchronous switch-mode boost converter operating at 600 KHz. Use of a synchronous switch-mode boost converter facilitates variable battery input of 3.0-4.2V to 5V regulated output with extremely high efficiencies. This high efficiency power conversion ensures maximum battery life and negligible IR loss.

Figure 16:
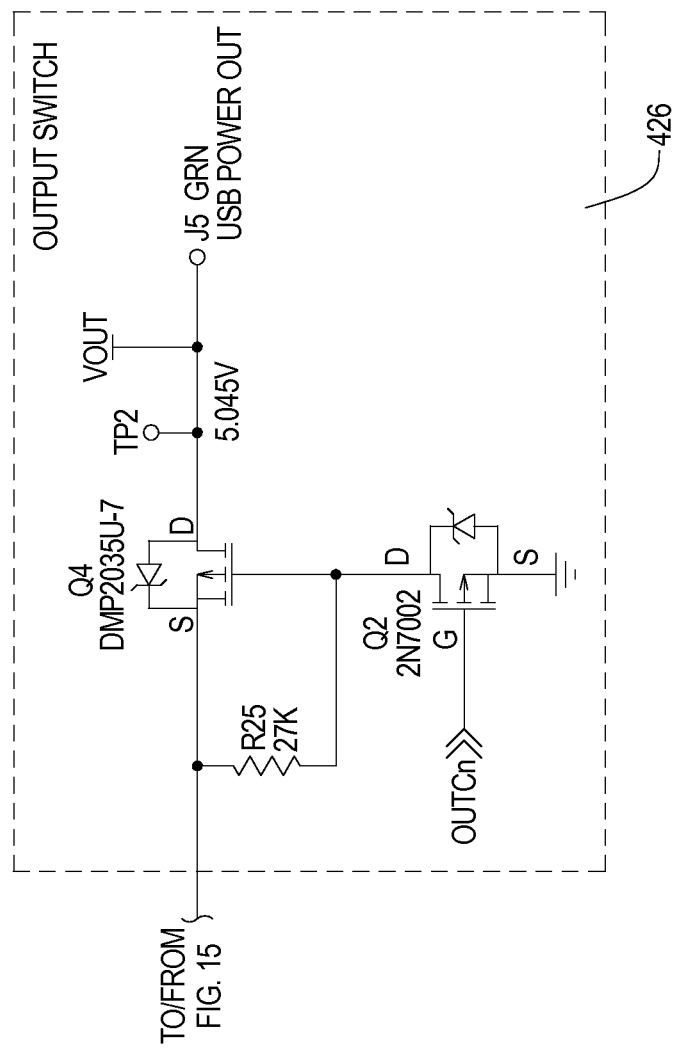
FIG. 16 is a partial schematic illustrating details of a circuit that may be used to embody an example output switch of the main board.

FIG. 16 illustrates details of an example circuit that may be used to embody the example output switch 426. The purpose of the output switch circuit is to enable the microcontroller to disconnect the power converter output from the USB output connector 192. This feature gives the system the ability to enhance the user experience by applying power to their device when appropriate and additionally provides an opportunity to disconnect an inappropriate load from the power converter if necessary.

Figure 17:
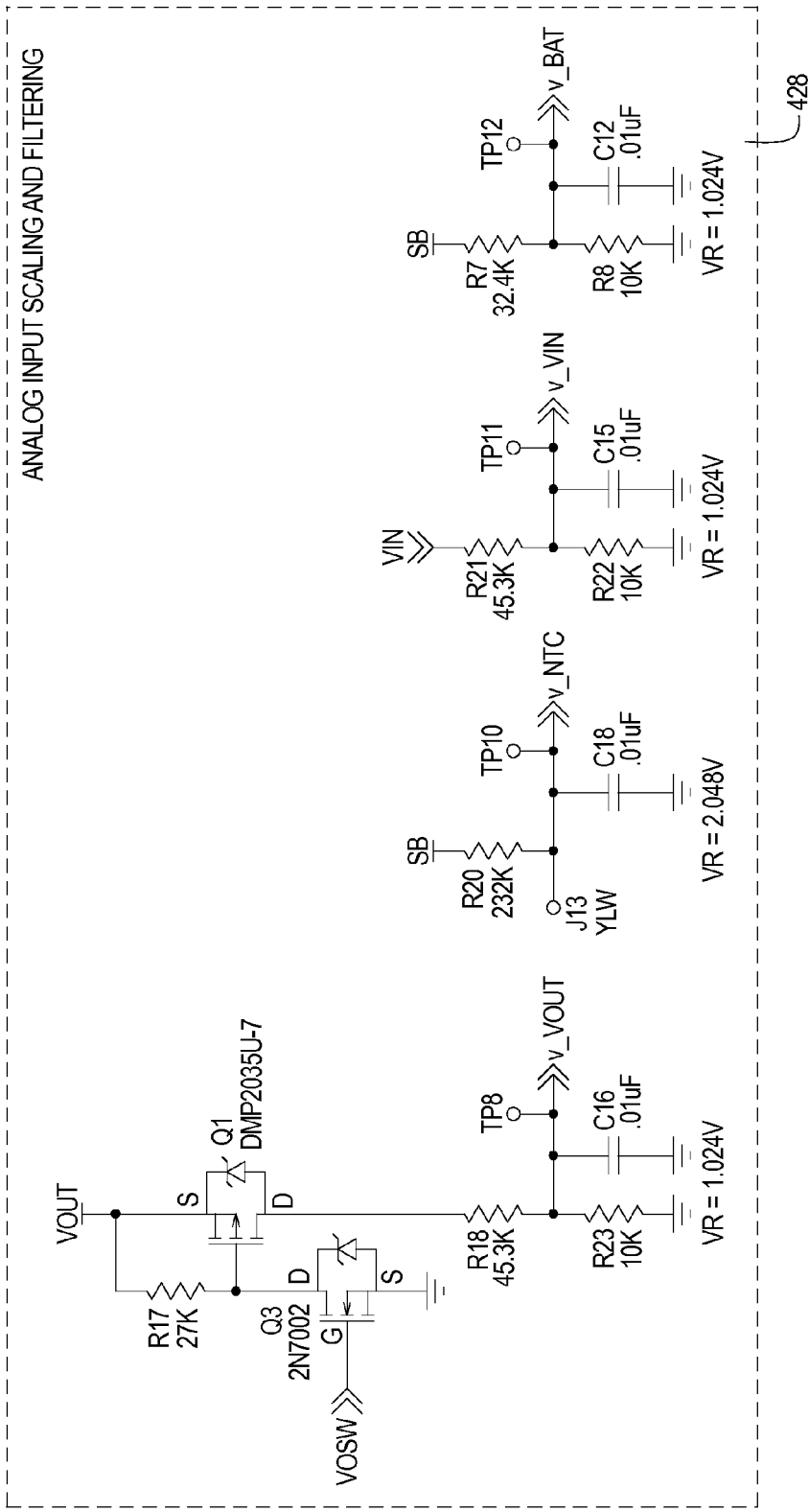
FIG. 17 is a partial schematic illustrating details of a number of circuits that may be used to embody example analog input scaling and filtering circuits of the main board.

FIG. 17 illustrates details of a number of example circuits that may be used to embody the example analog input scaling and filtering circuit 428. The example analog input filtering and scaling circuits perform two functions. The resistor divider network scales the incoming voltage to a level appropriate for analog to digital conversion. The reference for the conversion is determined in software and provided by hardware internal to the microcontroller device. The reference voltage could be generated by an external device just as easily. In addition, the arrangement of resistor and capacitor at each analog circuit forms a single pole low pass filter. The filter bandpass frequency, output impedance and phase angle are selected appropriately to accommodate the frequency, input impedance, and timing requirements of the analog to digital converter circuit inside the microcontroller.

Figure 18:
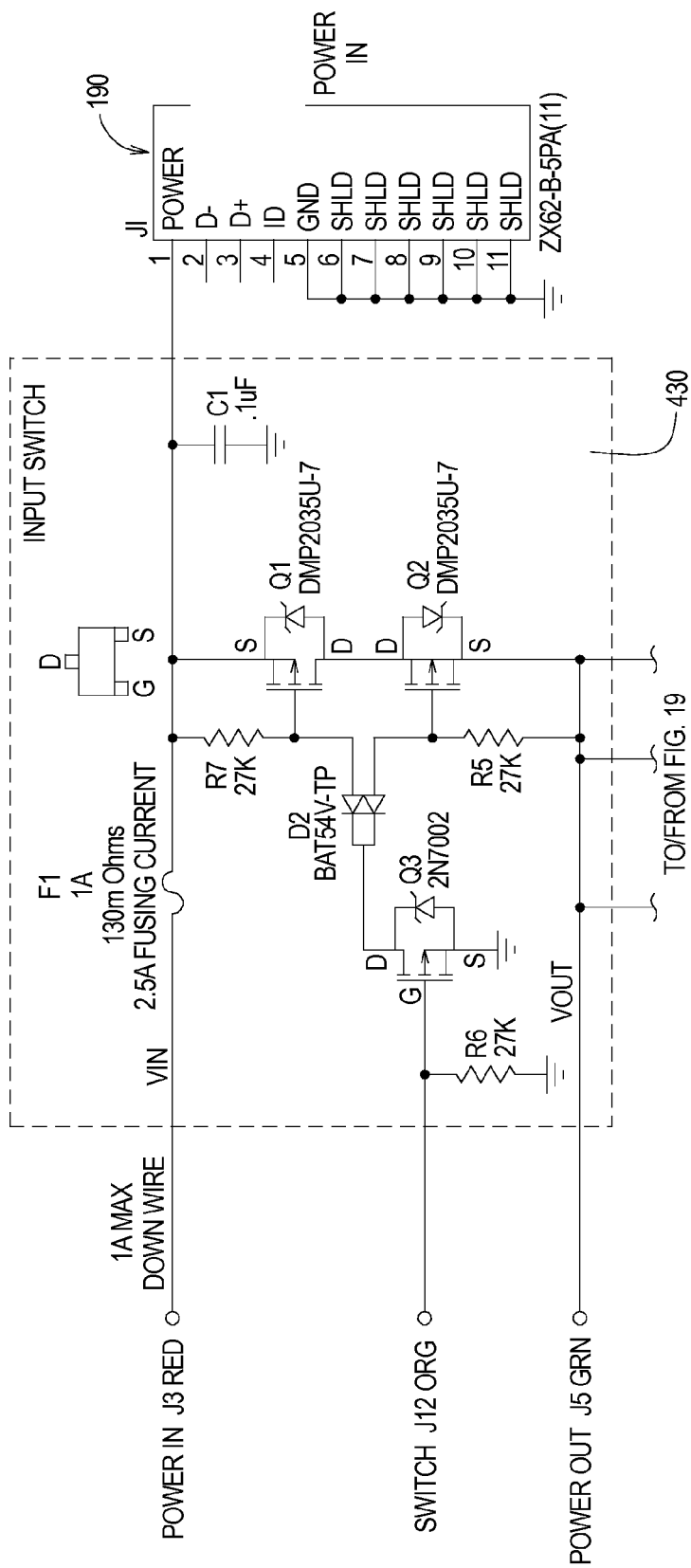
FIG. 18 is a partial schematic illustrating details of a circuit that may be used to embody an example input switch of the satellite board.

FIG. 18 is a partial schematic illustrating details of an example circuit that may be used to embody the input switch 430. FIG. 18 further illustrates how the example circuit forming the example input switch 430 is connected to the example first satellite connector 190. The purpose of the input switch circuit is to allow the microcontroller to optionally direct the input power directly to the output connector in addition to the charge controller. This feature allows the system to optionally run in a "pass-through" mode whereby the user device can be charged concurrently while the system battery is being charged.

Figure 19:
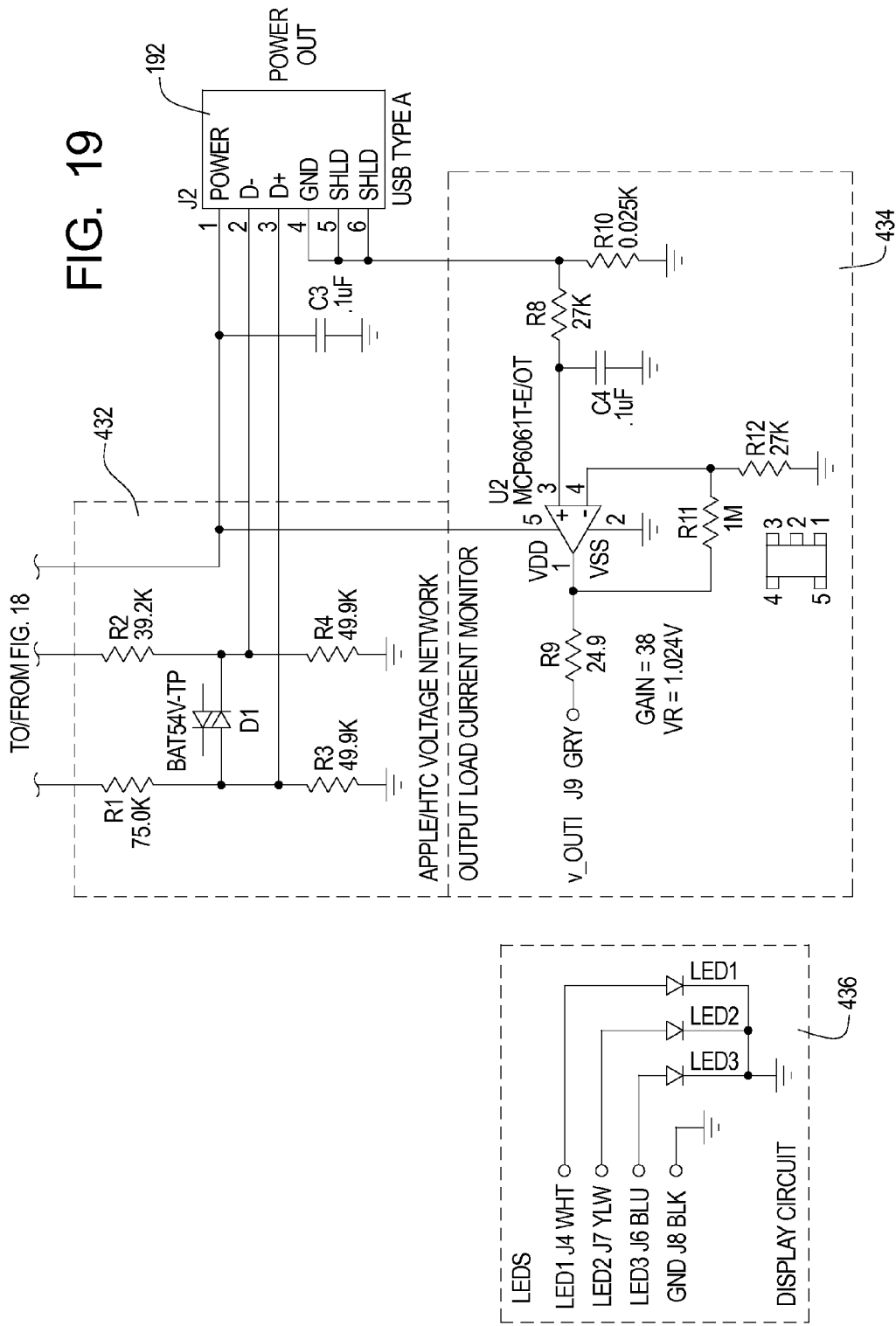
FIG. 19 is a partial schematic illustrating details of circuits that may be used to embody an example device voltage network, current monitor, and display circuit of the satellite board.

FIG. 19 illustrates the details of example circuits that may be used to embody the example device voltage network 432. The purpose of the voltage network is to provide a USB compliant voltage level on the USB D+/D− data wires indicating to the user's device that it is connected to a source of charge power.

The purpose of the output current monitor is to measure the current draw of the user's device. This information is used to determine when a user device is attached to the J2 192 connector and obviates the necessity of an on/off power switch.

The purpose of the LED display is to communicate various information about the system to the user including:
1. battery charge level during charge up;
2. battery charge level during power mode with users device;
3. pass-through mode status;
4. error conditions; and
5. firmware code version.

Any type of display could easily be substituted for the 3 LED indicator panel 46 used by the example interface system 40 describe and depicted herein. For example, the indicator panel 46 may be replaced with 5 (or more) LED's, an LCD (liquid crystal display) panel, an LED or OLED matrix, and so on. Additionally, although the example indicator panel 46 uses the 3 LED display to indicate the five sample information cases listed above, that 3 or 5 LED's could just as easily be used to indicate a information in addition to the five sample information cases identified above. In the case of LED's, the amount of communicated information is limited only by the binary combination of LED's available and other patterns such as blink rate and lighting pattern sequence.

FIG. 19 further illustrates how the example circuits forming example device voltage network 432 and example current monitor 434 are connected to the example second satellite connector 192. FIG. 19 further clarifies that the first, second, and third LED's 440, 442, and 444 form the example display circuit 436 and are mounted on the example satellite board 156.

As described above and generally depicted in FIGS. 12-19, the example microcontroller 420 generates control signals for controlling the battery charger 422, power converter 424, output switch 426, input switch 430, and display circuit 436 based on input data received from the battery charger 422, power converter 424, output switch, and current monitor 434 through the analog input scaling and filtering circuits 428. More particularly, the example microcontroller 420 runs software, as will be described in detail below, that generates the control signals based on the input data. The software and logic implemented thereby will now be discussed in further detail.

When charge voltage is applied to the first satellite connector 190 as shown, for example, in FIG. 8, the software running on the microcontroller 420 determines the type (e.g., operating characteristics) of the power adapter 322. This is done using one or both of two techniques. As a first technique, the software is programmed to assume that that the charge signal applied to the first satellite connector 190 has a voltage of 5V. When the charger is switched ON, a voltage drop will occur across the charge cable 324 between the connector 190 and the power adapter 322. If this voltage drop exceeds a predetermined value, the software determines that insufficient current is available from the charging source or, possibly, that the charge cable 324 is damaged. Either way, the software assumes that there is a problem, and the microcontroller 420 reduces the charging current. If the reduced charging current yields an acceptable voltage drop, the software allows the charting process to continue. If the voltage drop is still not acceptable, the software determines that either the charger is insufficient or the cable is damaged, and the microcontroller 420 switches the charge current off.

As a second technique, the software may be configured to test the state of the USB D+/D− data pins of the incoming charge power from connector 190 (J1). Although these pins are not connected in the present circuit diagram, a receiving circuit may be connected to the D+/D− pins and to the microcontroller. The state of these pins can be used to indicate that a high power charge source is available. If a high power charge source is detected, the software can operate in a high current charge mode and effectively shorten the time it takes to charge the battery 30. If a high power charge source is not detected, then the software operates in a normal charge mode.

The software running on the microprocessor 420 may further operate in a pass-through mode when connected as shown in FIG. 10 or 11. The pass-through mode allows incoming charge power to be shunted directly from the first satellite connector 190 to the second satellite connector 192 in addition to the connection to the battery charger 422. The implementation of a pass-through mode allows the software to choose how to manage incoming charge power when the portable electronic device 350 is connected to the first example rechargeable power supply system 20. In one example pass-through mode, the first example rechargeable power supply system prioritizes charging of the portable electronic device 350 over the charging of the battery 30. After a calculated or predetermined time period, the software will switch from the pass-through mode to charge mode to charge the battery 30. The process performed during this example pass-through mode will fully charge the battery of the portable electronic device 350 as a priority and then charge the internal battery 30 if time permits.

The software running on the microprocessor 420 may detect when a charge source (e.g., outlet 320 or solar panel 380) and/or load (e.g., portable electronic device 350) is present. A charge source is detected by measuring the voltage on the first satellite connector 190. A load is detected by measuring the load current on the second satellite connector 192. By detecting the presence of a charge source and/or load, the software does not require user intervention to turn on and/or turn off charging of either the internal battery 30 or the portable electronic device 350. The example first example rechargeable power supply system 20 thus requires no buttons or switches.

In addition, the software running on the microprocessor 420 may determine whether or not the internal battery 30 is not working properly by measuring the current consumption and voltage of the battery 30. If current consumption and voltage are within a predetermined normal operating profile, the software determines that the internal battery is operating correctly. If any one of the charge voltage, load voltage, charge current, or load current is not within the ranges or limits prescribed by the predetermined normal operating profile, then an error condition is generated, and the software controls the microprocessor 420 to stop using (e.g., charging or discharging) the battery 30 before damage occurs.

The example first example rechargeable power supply system 20 is further capable of determining whether the internal battery 30 and/or the system 20 more generally is working properly by measuring the temperature of the internal battery 30. In particular, battery temperature is measured by mounting an NTC thermistor on the internal battery 30. For example, if normal battery operation occurs for charging when the battery is between 0 to 45 degrees C. and for loading (i.e., discharging) between −20 to +70 degrees C., the software running on the microprocessor 420 may prevent operation of the power supply system 20 if the battery operating temperature falls outside of these ranges while operating in the corresponding charge or power modes, respectively. This feature prevents the lithium polymer cell forming the battery 30 from being damaged when the temperature is inappropriate for operating in charge mode. If the lithium polymer cell forming the battery 30 is already damaged, this feature prevents the problem from getting worse.

The software running on the microcontroller 420 may further monitor the battery condition by periodically measuring one or more operating characteristics of the batter 30. When a battery is being charged, a voltage across the battery terminals increases. If the cell is old or damaged, applying a charge current to the battery may result in excessive heat. The software can also be configured to determine that a battery problem exists if the battery voltage does not increase a certain amount in a certain time period after the charge current is initially applied to the battery 30. The software can thus determine whether or not battery problems exist if even the NTC thermistor is not mounted on the battery 30 or is not functioning properly.

The software running on the microprocessor 420 may optionally be configured such that the first example rechargeable power supply system of the present invention has several charging "personalities". Many different makes and models of portable electronic devices may be used as the portable electronic device 350 in conjunction with the power supply system of the present invention. Each of these different makes and models of the portable electronic devices that may be charged by the power supply system 20 may have a unique method of determining whether a charging source is appropriate.

The example first example rechargeable power supply system 20 has a single charge port, and the software running on the example microprocessor 42 may be configured to cycle through a number of different charging modes to determine which of these modes matches the load requirements. For example, the software may be configured to operate in a first charge mode or configuration and test the load current. The software may operate in a second charge mode or configuration and then test the load current again. The software determines that the charge mode resulting in the highest load current is the charge mode that best matches the load attached. This feature maintains compatibility with multiple makes and models of charging devices, while conventional power supply systems normally require different hardware for each type of charging device. This feature also negates the necessity of providing more than one charging port and relieves the user from having to guess which charging port to use for their charging device.

A problem with lithium polymer cells is that, if they remain fully charged for extended time periods, the cell can become damaged such that it loses a percentage of it's charge capacity. Many battery operated products are designed to prevent battery drain, thereby allowing the battery to stay charged for extended time periods. Since this strategy is bad for lithium polymer cells, the software system associated with the example first example rechargeable power supply system is designed to constantly drain the battery at a known rate. For example, the drain rate may be calculated to allow the power supply system 20 to maintain useable power for 3-6 months, but not longer. After six months, the battery 30 of the power supply system 20 will be drained low enough that the power supply system 20 shuts down to stop at an appropriate level (e.g., 3.1V) to prevent further battery drain. Following this discharge protocol allows the battery 30 to be recovered after running the battery 30 through two to three complete charge cycles.

The software running on the microprocessor 420 further operates in a hibernation mode in which an 8V signal is applied to the charging USB port force the power supply system 20 into a hibernation state. This is not normally possible with standard 5V from a USB port. This process can be done by the manufacturer at the factory prior to shipping to allow the rechargeable power supply 20 to be shipped in its low power mode. The first example rechargeable power supply system 20 automatically recovers from this hibernation mode, without the use of buttons or switches, when normal operating power is applied.

The example rechargeable power supply may further be configured to detect a cable use fault in which a cable is connected between the first and second satellite connectors of the same device. When this cable use fault is detected, the software running on the microprocessor 420 may be optionally configured to perform a special function such as forcing Joey to restart the operating program at the beginning, flashing its revision code using the LED display, or entering any other available operating mode. Detecting this state prevents the example power supply system 20 from rapidly draining its own battery by trying to charge itself.

Referring initially to FIGS. 20 and 20A of the drawing, depicted therein is a second example rechargeable power supply system 520 constructed in accordance with, and embodying, the principles of the present invention. The second example rechargeable power supply system 520 is some respects similar to the first example rechargeable power supply 20 described above. The second example rechargeable power supply system 520 will thus be described herein primarily to the extent that it differs from the first example rechargeable power supply system 20.

The second example rechargeable power supply system 520 comprises a main module 522, a satellite module 524, and a tether cable assembly 526. Power is stored in the main module 522 and accessed through the satellite module 524, and the tether cable assembly 526 extends between and electrically connects the main module 522 and the satellite module 524. The main module 522 comprises an energy storage device 530 such as a battery or battery pack capable of storing and supplying electrical power.

FIG. 20A shows that the example satellite module 524 has an interface system 540 comprising an input port 542, an output port 544, and an indicator panel 546 (FIG. 20). The tether cable assembly 526 connects the input port 542 to the battery 530 such that an appropriate charge signal applied to the input port 542 charges the battery 530 in a charge mode. The tether cable assembly 526 similarly connects the output port 544 to the battery 530 such that a power signal appropriate for applying power to an electronic device is available at the output port 544 in a power mode. With access of the satellite module 524, but without touching or even seeing the main module 522, the user of the example rechargeable power system 520 thus may charge and/or obtain power from the battery 530. The example indicator panel 546 is also operatively connected to the battery 530 through the tether cable assembly 526. The example indicator panel 546 is thus capable of communicating information about the status of the battery 530 to a user who has access to the satellite module 524 but not the main module 522.

Figure 21A:
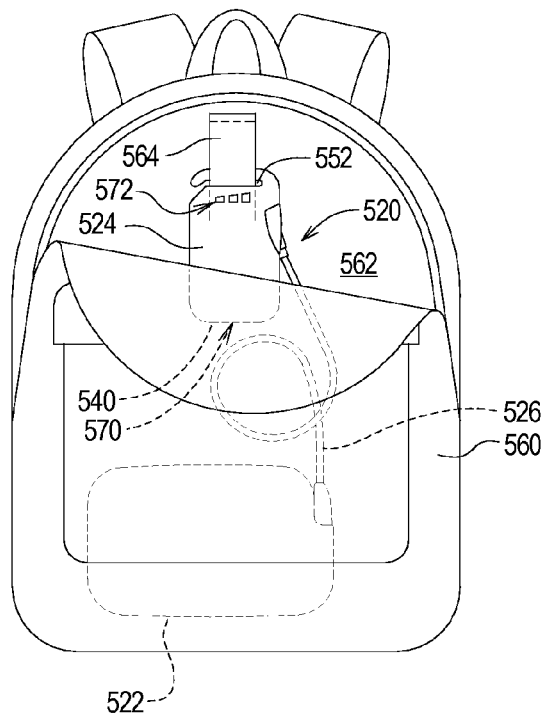
FIG. 21A is a partial schematic view of the second example rechargeable power supply being used with portable container such as a backpack, with the satellite module of the second example rechargeable power supply being shown in a first position relative to the backpack.
Figure 21B:
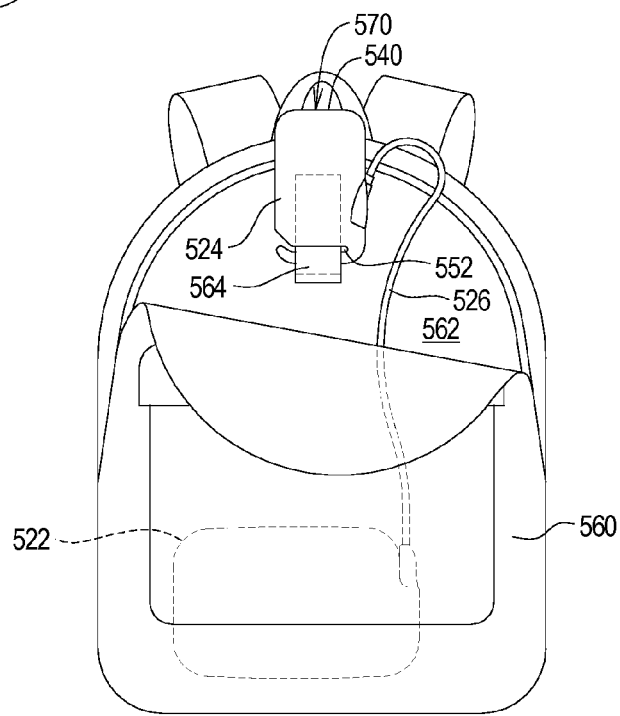
FIG. 21B is a partial schematic view of the second example rechargeable power supply being used with portable container such as a backpack, with the satellite module of the second example rechargeable power supply being shown in a second position relative to the backpack.

The example satellite module 524 is in many respects similar to the example satellite module 24 discussed above. Unlike the example satellite module 24, however, the example satellite module 524 comprises a housing assembly 550 that defines a support slot 552. The example support slot 552 comprises an inlet portion 554 and a support portion 556 and defines a slot axis A. As shown in FIGS. 21A and 21B, the example satellite module 524 is adapted to be supported by a portable container 560. In particular, the portable container 560 defines a container chamber 562, and a strap member 564 is secured within the container chamber 562.

The example clip slot 552 is sized and dimensioned to receive the strap member 564 to allow the satellite module 524 to hang within the container chamber 562 in a first position. In particular, when the satellite module 524 is supported from the strap member 564, the strap member 564 resides in the support portion 556 of the support slot 552. As shown in FIG. 20, the example inlet portion 554 is angled with respect to the support portion 556 to allow the strap member 564 to be inserted into and removed from the support portion 556 by manual manipulation. The inlet portion 554 may take any form of inhibiting capable of inadvertent movement of the strap member 564 out of the support portion 556 as described above. Further, snap clips or the like capable of being detachably attached to the portable container 560 may be substituted for the example support slot 552.

As shown in FIGS. 20 and 20A of the drawing, the example interface system 540 of the satellite module 524 comprises a first interface portion 570 comprising the input and output ports 542 and 544 and a second interface portion 572 comprising the indicator panel 546. In the second example rechargeable power supply 520, the first interface portion 570 is formed on an end wall 574 of the satellite module 524 generally opposite of the support slot 552. The second interface portion 572 is formed on a front wall 576 of the satellite module 524. The example second interface portion 572 is between the support slot 552 and the end wall 574 adjacent to the support slot 552.

As shown in FIG. 21A, the first interface portion 570 faces down when the satellite module 524 hangs in the first position and the second interface portion 572 faces the container chamber 562. Accordingly, in this first position, any cables connected to the interface system 540 will, at least adjacent to the satellite module 524, extend downward into the container chamber 562 in a direction generally perpendicular to the support axis A defined by the support slot 552. In addition, the example tether cable 526 extends at an angle relative to the support axis A such that the portion of the tether cable 526 adjacent to the satellite module 524 also extends down into the container chamber 562.

Further, the flexibility of the strap member 564 in engagement with the support slot 552 allows the satellite module 524 to be arranged (e.g., rotated about the support axis A) in a second position in which the first portion 570 of the interface system 540 faces up as shown in FIG. 21B. In this second position, the interface portion 540 extends up and out of or towards the opening of the container chamber 562 to facilitate connection and disconnection of cables from the first interface portion 570 of the interface system 540. In both the first and second positions, the second interface portion 572 is easily visible to the user.

Turning now to FIG. 22, depicted therein is an electrical block diagram representing the operation of the electronics contained on a main board 620 and satellite board 622 of the second example rechargeable power supply 520. FIG. 22 also depicts the tether cable assembly 26 and, in particular, first and second power conductors 630 and 632 and a data conductor 634 that extend between the main board 620 and the satellite board 622.

The example main board 620 comprises only the battery 530 in this second example rechargeable power supply 520. The satellite board 622 comprises a microcontroller 640, a battery charger 642, a power converter 644, an output switch 646, and an analog input scaling and filtering circuit 648. In contrast, these components were mounted on the main board 154 in the first example rechargeable power supply 20. The satellite board 622 further comprises an input switch 650, a device voltage network 652, a current monitor circuit 654, and a display circuit 656.

FIG. 22 also shows that first and second satellite connectors 660 and 662 are also mounted on the example satellite board 622. The first and second satellite connectors 660 and 662 form the input port 542 and the output port 544, respectively, of the example interface system 540.

Exhibit A
General Description

This invention is a portable rechargeable power supply ("Invention"). In the present form it is intended primarily for USB compatible charging devices and loads, however similar principals may be applied to non USB compliant chargers and loads if the input and output connectors and circuitry were altered. The intended use is for remote recharging of small electronic products like cell phones, tablet computers, MP3 players, electronic games, etc.

This system is comprised of a "Main" unit, a "Satellite" unit and a wire that joins the Main to the Satellite. The Main unit has the storage battery and the majority of electronic components. The Main unit is intended to be hidden and generally inaccessible to the user by locating it in a garment compartment or pocket. The Satellite unit is the user interface and is easily accessible by the user. It contains the input and output connectors and LED lights to indicate system operating status and fuel gauge information.

Basic Operating Principal

A user charges the Invention by plugging it into a wall outlet power supply, a USB host charging source, a 12V car charging source, or other compatible charging sources. The LED lights on the Satellite unit light up in a manner that indicates the charge level of the battery inside the Invention. In its present form the lights are generally blinking while charging activity is taking place. One LED indicates zero to ⅓ charge. 2 LED's indicate ⅓ to ⅔ charge. 3 LED's indicate ⅔ to 3/3 charge and all 3 LED's on solid indicates a full charge has been attained.

At any time the user may plug a load device into the Invention using the second connector on the Satellite unit. The Invention will supply power to the load. At any time while the Invention's battery is above zero charge the user may unplug the Invention from its charging power source and the Invention will continue supplying power to the load device until either the load has been removed or the Invention's battery is depleted.

If the user has unplugged the Invention from a charging source and a load device is attached to it, the Invention intermittently blinks it's LED's to indicate to the user the remaining charge level of the Inventions battery. The blink interval is something less than 1 second on and several seconds off to conserve battery power. The number of LED's that light during each blink are determined in ⅓ increments similar to the charging level as described above. This advises the user of the power remaining in the Invention as it is depleted by the load.

Special Features of the Invention

For the present version of the Invention there are no buttons or switches to simplify using the system. Without an on/off switch the product maintains an "always on" state. There may be several hours, days, or even weeks between use, therefore it is necessary that the Invention consume very little power in an "idle" state (with no load attached).

Additionally, the Invention has circuitry to automatically detect when a load is attached or removed. This detection circuitry causes the Invention to automatically determine which operating mode to be in thus alleviating the need for a user to control its operation with buttons or switches.

This version of the Invention has a Main and Satellite (2 part) system joined together by a wire. This wire is flexible and bendable. This wire has been designed in a specialized way that provides maximum strength and durability.

Thus the first two use modes for the Invention are 1) a mode where its battery is being charged or 2) when it is supplying power to a load device. This Invention has an important 3rd mode of operation that automatically detects when both a load device (such as a cell phone) is attached and it is plugged into a charging source (such as a wall outlet) in this situation the Invention can switch the incoming power (from the wall outlet) directly to the output load, bypassing the Main unit entirely. Or if power source and demand allow, it can supply power to both simultaneously. This feature optimizes the user experience by more efficiently using the charge source power and by intelligently deciding when to charge the users load device before charging its own battery.

Technical Details Summary

This system is comprised of the following basic components (refer to the schematic diagrams for the Main and Satellite units):

1. Battery charger (Main, U2)—when incoming charge power is detected this component converts the incoming power into the appropriate battery charge voltage and current.
2. Boost converter (Main, U1)—this component converts the battery voltage into 5V USB compatible voltage.
3. Microcontroller (Main, U3)—this component provides a method for the system to make intelligent decisions about how to operate during different circumstances. It can decide when to charge, how fast to charge, when to supply power or not, which LED's turn on or off, detect improper load conditions and many other decisions to maximize the user experience and function of the system.
4. Current detector (Satellite, U2)—this component measures the load current and sends its output signal to the microcontroller.
5. Bypass mode switches (Satellite, Q1 & Q2)—provides a low IR drop path from input to output, and this mode allows the simultaneous charging of its own battery and a load device on its output.
6. LED indicators (Satellite, LED1, LED2, LED3)—visual indication to the user on battery fuel gauge, status or error information.
7. USB connectors (Satellite, J1 & J2)—provides input and output connections to the outside world.

Detailed Technical Description

Charge power is applied to J1, goes through fuse F1 and down the wire to the Main unit pcb. Charge power is then applied to the input of U2. U2 is a single cell lithium polymer battery charge management controller and converts the incoming power into the appropriate voltage and current to charge the battery connected to terminals J10 and J11.

The battery terminals J10 and J11 are permanently connected to various parts of the circuit including the power pins of the microcontroller (U3). This allows the microcontroller to continue operating independently of other circuit functions as long as there is some battery voltage available. This also provides a level of immunity against voltage surges or heavy loads that might otherwise affect the regulated output. The microcontroller chosen has a wide operating voltage range from 5V all the way down to around 1.8V making it an ideal choice for battery powered applications.

The incoming power appears on Main Board terminals J3 (power) and J8 (gnd). These are also connected to a voltage divider network R21 and R22 and filter capacitor C15 and then continues onto microcontroller input terminal RB3. The RB3 io pin is configured as an analog input to its internal analog to digital converter that allows the microcontroller to accurately measure the input voltage.

When a charge source is attached the input source impedance of U2 is 1.2 A. This is appropriate for a fast charge mode of operation. However, if the input voltage drops to 4.2V or less the microcontroller switches the input impedance of U2 to 500 ma and re-measures the voltage at J3. This input impedance state change is accomplished by U3 changing states of its io pin RC1. If the voltage is above 4.2V, then the unit charges at this medium charge setting. If the voltage measured at J3 is less than 4.2V at the 500 ma charge setting then U3 disables the charger by pulling io pin RC0 high. This pin is connected directly to the charge enable pin on U2 and charging is stopped at this time.

Battery terminals J10 and J11 are connected to input terminals of boost converter U1. U1 converts the variable battery voltage of 3.1 to 4.2 volts into a regulated DC output voltage of 5V appropriate for USB devices. U3 can control the operation of U1 by changing states of the U1 PSE (Power Supply Enable) pin on io pin RB1 of U3.

Q4 is a p-channel MOSFET power switch and is controlled by Q2 that is in turn controlled by U3 at io pin RC2. Control of this power switch allows U3 to disconnect the load from the 5V power output when necessary—like during pass-through power mode.

Q4 is connected to output terminal J5 which gets connected to the interconnect cable between the Main and Satellite units. On the Satellite unit the output power wire is connected to J5 and is directly tied to output USB connector J2.

The ground wire on J2 is connected through current sense resistor R10. Op-Amp U2 amplifies the voltage dropped across R10 and its output voltage is directly proportional to the current passing through R10. This circuit allows the unit to accurately measure load current. The amplified output voltage of U2 is connected to wire terminal J9, goes down the interconnecting cable to the Main unit at terminal J9 and is measured inside the analog to digital converter of U3 at pin RA2.

The interconnecting wire between the Main and Satellite unit is around 30 cm in length. The 3 power wires (24 awg stranded) in the present design represent around 0.026 ohms of DC resistance. This resistance lowers the efficiency of the system when operating from a battery. To reduce this power loss, components Q1, Q2, Q3, R5 and R6 on the Satellite unit were added. These components provide pass-through power when a wall charger is present at J1. U3 detects power available and switches output RB5 on. This is connected through the wire to the Satellite unit to J12 and controls the on/off state of Q1 and Q2, Q1 and Q2 are p-channel MOSFETs arranged in a back to back configuration. This circuit takes advantage of the fact that a MOSFET junction is bipolar and as long as the gate/source bias is correct they will (or will not) conduct in both directions. The advantage to this circuit arrangement is that with a more traditional active switch arrangement there would be the possibility of an additional diode voltage drop. This circuit has no forward conducting diode drop and effectively switches the incoming power directly to the output with very little power loss.

USB protocol specifications define limitations on USB compatible loads to prevent overloading standard USB power sources. Some industry products such as cell phones and tablets use unique detection mechanisms with their own USB compatible power sources to allow their load devices to know when it is appropriate to present a large load impedance to their own charge source (and not others). These devices use various mechanisms to determine this so they maintain compatibility with standard USB charge sources and allow their own charge sources to provide additional power for shorter charge times.

Components R1, R2, R3, R4, and D1 on the Satellite unit comprise a novel circuit that meets some of the most common large load detection schemes while maintaining compatibility with standard USB specifications.

LED1, LED2, and LED3 comprise status lights that indicate to the user information on battery fuel gauge levels, charging and discharging status as well as error modes if they are present. They are connected to terminals J4, J6, J7 go down the cable to Main Board terminals J4, J7, J6 and are controlled directly from U3 on port pins RC3, RC4, RC5.

Debug header J1 is used during programming and/or debugging of controller U3.

MOSFETs Q1 and Q3 on the Main unit act as a switch to connect the output terminal J5 to measuring circuit comprised of R18, R23, C16 and U3 at io pin RB0. U3 converts this analog voltage to a digital value to measure the U1 output voltage.

The Li-Polymer battery connected at terminals J10 and J11 has a safety circuit on it. This circuit has a 10K NTC thermistor on board and is connected to the Main unit and battery ground via a 3rd battery wire at connection point "NTC". Along with resistor R20 and C18 this forms a voltage divider and this output is measured by U3 at io pin RA3. The microcontroller can determine if the battery temperature is within a safe operating range.

Components R7, R8, C12 form another voltage divider that together with U3 at io pin RA0 can measure the battery voltage. This provides valuable information used as part of the fuel gauge for the battery.

Components TP1-TP20 are solder pads located on the bottom of the circuit board. These pads are installed at all parts of the circuit where important voltages can be measured by a test instrument. This board can be clamped onto a custom designed "bed of nails" test instrument with mating pins in the exact X,Y coordinate locations of the pads for use in a functional test. Additionally, TP6, connected to U3 RB2 is used to control the test mode on/off state. TP13 and TP14 are connected to U3 R6 and R7 and are used for UART serial communications between the device under test and the test instrument.

Features Considered to be Novel

1. The Invention consists of 3 parts—Main Unit, Satellite Unit and Interconnecting Wire.

The Main unit is comprised the battery and electronic circuitry. This part of the system is intended to be hidden away in a pocket or compartment and generally inaccessible by the user during normal use.

The Satellite Unit at the other end of the cable is the user interface portion of the Invention and is comprised of the input connector, the output connector and indicator LED's that communicate system status and battery fuel gauge information to the user and other circuitry.

The Interconnecting Wire joins the Satellite Unit to the Main Unit and carries electrical power and information that support operation of the system.

The 3-part design of the Invention allows unique integration options into other products (backpacks, briefcases, handbags, luggage, day packs, other bags, jackets or other garments, camping tents, etc.) by solving several integration challenges for the designers of such bags, garments, etc. Most fundamentally it allows the Main and Satellite units to be located in different and more appropriate locations within the bag or garment or gear. Specifically the designers of such bags, etc., may need the user interface (Satellite) to be located in an easily accessible part of the bag or garment, while the battery unit (Main) can be located in a more inaccessible part of the item.

This separation of Main and Satellite by cable also creates a more pliable, physically flexible device overall, better matched to products (bags, etc.) made from pliable fabrics and to being adapted to awkward spaces and configurations within bags, garments and gear. It allows the bags, garments and other items to be flexed and contorted during their normal use.

This provides increased safety over "all in one" rechargeable battery blocks as the flexibility between the Main and Satellite unit can reduce the likelihood that the USB accessory cables plugged in by the end user will be deformed or partially detached during the bag, garment, etc., use. The end user is also more likely to be able to visually inspect the quality of the USB connection during use (compared to an accessory cable plugged into a battery block that is located deep within a briefcase, etc.).

2. The shape of the Main Unit and Satellite Unit and Wire are unique. The Main and Satellite Units are small shaped units with no sharp corners or hard angles. They are very smooth designs that allow them to be easily placed onto, into, or next to soft fabrics or other materials that may house the Invention.

The benefit of this unique size and shape being smooth, and rounded is that it is very unlikely to get caught onto fabrics or other materials during assembly or normal day to day use. This allows designers to intentionally design the Satellite to slip into and out of pockets and to move/slide with the contortions of the bag or garment rather than causing wear. The shape also reduces wear on the fabrics, seams and materials overall, and importantly, reduces wear on fabric or material coatings or laminates such as those that create water resistance.

3. When charge power is applied to the Invention it tries to charge its battery at 1.2 A of current. MCU (Microcontroller) (U3) monitors the voltage on the input to determine if the charge source can supply this much current and stays at this setting if it can. If the charge source cannot supply this much current the MCU changes the input impedance of the charge controller (U2) to 500 ma. The MCU measures the input voltage again to determine of the charge source can supply this much current and stays at this setting if it can. If it cannot then the MCU adjusts the input impedance of the charge controller once again effectively disabling the charge controller.

The benefit of this feature is that the Invention can dynamically and automatically sense the output impedance of the charge source and adjust its load to match. This enables the Invention to accommodate a plurality of unknown charge controllers including USB host sources to charge the battery of the Invention.

4. The present version of this Invention has no buttons or switches and is essentially always on as long as the battery has some charge on it. When a load is attached to J2 it draws current through sense resistor R10 on the Satellite Unit which gets amplified by op-amp U2 on the Satellite Unit. The op-amp converts the current into a voltage that gets sent through the Interconnecting Wire to the Main Unit where it gets processed by the MCU.

The benefit of this feature is that by being able to automatically detect the presence or absence of a load the Invention can determine when to activate and automatically come out of a power conservation mode and start interacting with a user or when automatically to go into a power conservation mode. This feature also alleviates a user from having to remember to turn the Invention on or off, preserving battery life and enhancing the user experience by allowing the Invention to accomplish these tasks without interaction from a user with buttons or switches.

5. When a charging source is attached to the Invention at the same time a load is attached to the Invention, the MCU detects both of these conditions and the MCU can route or re-route power based on programmed criteria to maximize the users experience. The primary different operating modes are:
  A) Charge controller on, Q1, Q2 off, Q4 off—Invention is charging its own battery and no power is going to the load.
  B) Charge controller off, Q1, Q2 on and Q4 off—The Invention is supplying all available incoming power to the load device and not charging its own power at all.
  C) Charge controller on in high current or low current mode, Q4 off, Q1 & Q2 on—The Invention is simultaneously charging its own battery and supplying power to the load.
  D) Charge controller is on or off in high or low current mode, Q4 is on, Q1 & Q2 on—The Invention may or may not be charging and the Invention is supplying power to a load and supplementing that power with its own battery if needed.

Other combinations are possible.

The benefit of these automatic detection and power selection modes are that the Invention has a tremendous amount of flexibility on how to handle incoming power. A problem it is solving is that the incoming power available is unknown until it is connected. If the available power is great enough then the Invention can charge rapidly and the load can charge rapidly and these can happen concurrently.

If the incoming power is not enough to charge the Invention rapidly and the load at the same time then the Invention can detect this and automatically alter its input impedance to allow a load to have priority for charging.

If the load has a battery that gets charged up then its input impedance will change as the battery gets full at which time the Invention can detect this condition and automatically re-route incoming power to charge its own battery at that time.

6. The Invention has layers of safety features that greatly reduce the risk of fire or injury to a user. These features are:

A) The Invention can measure the incoming voltage to ensure that it does not overload a charging source.
B) The Invention has a fuse (F1) that will automatically open the power input connection if a short or excessive load is present on the power input wire.
C) If the output is shorted the U1 boost converter IC has built in short circuit protection and will shut off its output in an overload or over temperature condition.
D) The Invention continuously measures the output voltage and if an excessive load is attached the voltage will drop and the Invention can disconnect the load from the Inventions battery by opening switch Q4.
E) The Invention monitors the output current and if excessive output current is detected it turns disconnects the output by switching off Q4.
F) The Invention continuously monitors the temperature of the battery with an NTC thermister attached to R20 and C18. If the temperature falls above or below safe operating zones then the Invention automatically turns the charge controller and/or power to the load off.
G) The battery for the invention has an independent hardware protection circuit in it that automatically disconnects the battery if it is over-voltaged, under-voltaged or over-currented.
H) The Invention has insulation on it's Interconnecting Wire that is high temperature rated to 150 degrees C.
I) The Invention has Interconnecting Wire that is constructed of 41 strands of #40 awg tin plated copper in the power wires (input, ground and output). This construction allows a much higher number of flexes and bends before breaking, lowering the risk of this element being a risk factor for excessive heat, smoke, fire or breakage.

7. Some cell phones have unique identification circuits to determine when they are connected to a non-USB compliant high current charging source. Common examples are iPhone (Registered trademark of Apple, Inc.) and HTC smartphones. These particular detection schemes are unique and generally incompatible.

This invention includes a unique and novel circuit that allows both of these detection mechanisms to coexist, properly identifying the Invention as a high current charge source to both cell phone types without interfering with one another.

This novel circuit is comprised of Satellite Unit components R1, R3, R2, R4 and D1. Resistors R1 and R3 form a voltage divider that with 5V on the input provides 2V on the D+ pin of J2. Resistors R2 and R4 form a voltage divider that with 5V on the input provides 2.7V on the D− pin of J2. These voltages allow an Iphone or Ipad device to think that they are connected to an Apple brand high current charge source.

The test an HTC device does to determine if it is connected to a high current charge source is to measure for a short between the D− and D+ pins. It does this by applying a low impedance voltage to the D+ pin and triggering off the D− pin for a result.

The HTC device uses a low impedance drive for its test allowing the measured voltage appearing on D− to swamp out the high impedance voltages present for the Ipad test.

The discovery here was that the polarity of the HTC test allows the insertion of diode D1 to accommodate the test without upsetting the voltage test performed by an Iphone or Ipad device because the D− voltage is greater than the D+ voltage. This presents a reverse (non conducting) polarity to diode D1 that reverse biases the diode which does not conduct in this configuration and does not interfere with the voltages present on D+ and D− during the Ipad or Iphone test.

However, the diode is forward biased and conducts during the HTC test allowing the HTC device to think it is attached to a high current charge source.

This novel arrangement of parts allows both tests to pass without interfering with one another.

8. The Invention is intended to be a high volume consumer device. In order to accommodate high volume production the Invention has several features that facilitate automated testing during the manufacturing process. These features are:
A) All points of significance in the design have probable test points attached and are accessible on the bottom side of the circuit board for the Main Unit. These test points are labeled in the schematic with a prefix of "TP" and may be accessed by attaching the Invention to a "bed of nails" type test platform to a manufacturing test computer system.
B) The MCU has manufacturing test firmware installed that can report important information to a manufacturing test computer system connected to test points TP6, TP13, TP14, TP5.
C) When the manufacturing test computer activates TP6, the MCU switches into test mode and configures TP13 and TP14 for uart serial communications mode.
D) By issuing specific commands via uart to the MCU, the MCU can be instructed to report back its measured values for all the other test points.
E) All of the test features can be activated by a test technician running the test computer and within seconds access all the vital and important information from the Invention. The test computer can rapidly evaluate if there are any problems or if the values are within a normal operating range.

What is claimed is:
1. A combination of:
a portable container;
a portable power supply comprising
a main module located at a first location within the ortable container, the main module comprising a main housing containing a main board and a rechargeable energy storage device;
a satellite module located at a second location within the portable container, the satellite module comprising
a satellite housing, where the satellite housing supports the input port, the output port, and the user interface, and
a satellite board comprising
at least one input port configured to be connected to an external power source,
at least one output port configured to be connected to an electronic device,
a user interface;
a tether cable comprising operatively connected between the main board and the satellite board, the tether cable comprising a first power cable, a second power cable, and a data cable, where
the data cable operatively connects the satellite board to the main board such that the user interface is capable of displaying data associated with the rechargeable energy storage device; whereby
the first location is spaced from the second location;
the second location is adjacent to an opening of the portable container during normal use of the portable container to facilitate access by a user to the at least one input port, the at least one output port, and the user interface to allow the user to
operatively connect the input port to the external power source through the opening in the portable container, operatively connect the output port to the electanic device through the opening in the portable container, and view the user interface through the opening in the portable container;

with the power source operatively connected to the at least one input port, the first power cable allows the external power source to supply power to the rechargeable energy storage without user access of the first location;

with the electronic device operatively connected to at least one output port, the second power cable allows the rechargeable energy storage device to supply power to the electronic device without user access of the first location.

2. A combination as recited in claim 1, in which the user interface comprises an indicator panel, where the indicator panel indicates a status of at least one characteristic of the portable power supply based on the data associated with the rechargeable energy storage device.

3. A combination as recited in claim 1, in which:
the rechargeable energy storage device is a battery;
the portable power supply comprises:
  a battery charger operatively connected to the battery, where the first power cable is operatively connected between the battery charger and the input port; and
  a power converter operatively connected to the battery, where the second power cable is operatively connected between the power converter and the output port.

4. A combination as recited in claim 3, in which the battery charger and the power converter are located in the satellite module.

5. A combination as recited in claim 3, in which the portable power supply further comprises a controller operatively connected to the battery charger and the power converter.

6. A combination as recited in claim 5, in which:
the portable power supply comprises at least one sensor for generating at least one data signal based on at least one parameter of the portable power supply; and
the controller comprises a software program for generating at least one control signal based on the at least one data signal for controlling at least one of the battery charger and the power converter.

7. A combination as recited in claim 3, in which the power converter is a boost converter.

8. A combination as recited in claim 1, in which:
the rechargeable energy storage device is a battery; and
the portable power supply comprises
  a first satellite connector that forms the input port,
  a second satellite connector that forms the output port,
  a battery charger operatively connected to the battery,
  a power converter operatively connected to the battery,
  an input switch operatively connected between the input port and the battery charger, and
  an output switch operatively connected between the output port and the power converter.

9. A combination as recited in claim 8, in which the portable power supply further comprises a controller operatively connected to the battery charger, the power converter, the input switch, and the output switch.

10. combination as recited in claim 9, in which:
the portable power supply comprises at least one sensor for generating at least one data signal based on at least one parameter of the portable power supply; and
the controller comprises a software program for generating, based on the at least one data signal, at least one control signal for controlling at least one of the battery charger, the power converter, the input switch, and the output switch.

11. A combination as recited in claim 8, in which the power converter is a boost converter.

12. A combination of:
a portable container; and
a portable power supply comprising
  a main module located at a first location within the portable container, the main module comprising a main housing containing a battery;
  a satellite module located at a second location within the portable container, the satellite module comprising
    a satellite housing,
    an input port supported by the satellite housing,
    an output port supported by the satellite housing, and
    an interface panel supported by the satellite housing;
  a tether cable operatively connected between the main housing and the satellite housing such that the main module is spaced from the satellite module, where the tether cable is configured to carry power signals between the battery and the input port and between the battery and the outlet port
  a controller; whereby
the first location is spaced from the second location;
the second location is adjacent to an opening of the portable container during normal use of the portable container to facilitate access by a user to the at least one input port, the at least one output port, and the user interface to allow the user to
  operatively connect the input port to an external power source through the opening in the portable container, and
  operatively connect the output port to an electronic device through the opening in the portable container, and
  view the user interface through the opening in the portable container;
the controller operates in
  a first mode to allow the battery to be charged when the external power supply is connected to the input port;
  a second mode to allow power to be supplied to the electronic device from the battery when the electronic device is connected to the output port; and
  a third mode to allow the battery to be charged and power to be supplied to the electronic device when the external power supply is connected to the input port and the electronic device is connected to the output port;
the controller is operatively connected to the battery to acquire data associated with the battery; and
the controller controls the user interface to display the data associated with the battery.

13. A portable power supply as recited in claim 12, further comprising:
a battery charger operatively connected to the battery and the input port, and
a power converter operatively connected to the battery and the output port; whereby
the controller controls the battery charger to charge the battery in the first mode; and
the controller operates the power converter to supply power to the electronic device in the second mode.

14. A portable power supply as recited in claim 12, further comprising:
at least one sensor for generating at least one data signal associated with at least one parameter of the portable power supply; and the controller comprises a software program for generating, based on the at least one data signal, at least one control signal for controlling at least one of the battery charger and the power converter.

15. A portable power supply as recited in claim 13, in which the power converter is a boost converter.

16. A portable power supply as recited in claim 12, further comprising:
a first satellite connector that forms the input port;
a second satellite connector that forms the output port;
a battery charger operatively connected to the battery;
a power converter operatively connected to the battery;
an input switch operatively connected between the input port and the battery charger; and
an output switch operatively connected between the output port and the power converter.

17. A method of providing power to an electronic device, the method comprising the steps of:
providing a main module comprising a main housing and a battery;
providing a satellite module comprising
a satellite housing,
an input port supported by the satellite housing,
an output port supported by the satellite housing, and
an interface panel supported by the satellite housing;
connecting a tether cable between the main module and the satellite module such that
power is communicated from the input port to the battery,
power is communicated from the battery to the output port,
data is communicated from the battery to the interface panel, and
the main housing is spaced from the satellite housing;
arranging the main module at a first location within a portable container;
arranging the satellite module at a second location within the portable container, where the second location is adjacent to an opening of the portable container during normal use of the portable container to facilitate access by a user to the at least one input port, the at least one output port, and the user interface;
operatively connecting the output port to the electronic device through the opening in the portable container such that power is supplied to electronic device from the battery;
operatively connecting the input port to the external power source through the opening in the portable container such that power is supplied to the battery form the external power source; and
viewing the user interface through the opening in the portable container to determine at least a status of the battery.

18. A method as recited in claim 17, further comprising the steps of:
providing a first satellite connector to form the input port;
providing a second satellite connector to form the output port;
operatively connecting a battery charger to the battery;
operatively connecting a power converter to the battery;
operatively connecting an input switch between the input port and the battery charger;
operatively connecting an output switch between the output port and the power converter;
generating at least one data signals based on at least one parameter of the portable power supply; and
generating at least one control signal based on the at least one data signal for controlling at least one of the battery charger, the power converter, the input switch, and the output switch.

* * * * *